United States Patent [19]

Ohta et al.

[11] Patent Number: 5,294,790
[45] Date of Patent: Mar. 15, 1994

[54] PROBE UNIT FOR NEAR-FIELD OPTICAL SCANNING MICROSCOPE

[75] Inventors: Yoshinori Ohta; Hiroshi Kajimura; Akitoshi Toda; Tsugiko Takase, all of Tokyo, Japan

[73] Assignee: Olympus Optical Co., Ltd., Tokyo, Japan

[21] Appl. No.: 957,404

[22] Filed: Oct. 6, 1992

[30] Foreign Application Priority Data

Oct. 9, 1991 [JP] Japan ................... 3-262235

[51] Int. Cl.$^5$ ................................. H01J 3/14
[52] U.S. Cl. ...................... 250/216; 250/227.24; 250/306
[58] Field of Search ............. 250/227.11, 227.20, 250/227.24, 227.26, 216, 234, 306, 307; 359/368, 370

[56] References Cited

U.S. PATENT DOCUMENTS 5,018,865  5/1991  Ferrell et al. ............. 250/227.11
5,025,147  6/1991  Dürig et al. ............. 250/306

OTHER PUBLICATIONS

Appl. Phys. Lett. 52(4), Jan. 24, 1988, "Near-Field Optical Scanning Microscopy In Reflection"; Fischer et al., pp. 249-251.
Appl. Phys. Lett. 49(11), Sep. 15, 1986, "Super-Resolution Fluorescence Near-Field Scanning Optical Microscopy"; Harootunian et al.; pp. 674-676.
Scanning Microscopy, vol. 3, No. 1, 1989; pp. 1-7; "Scanning Near Field Optical Microscopy (SNOM) In Reflection Or Scanning Optical Tunneling Microscopy (SOTM)"; Fisher et al.
J. Appl. Phys. 59(10), May 15, 1986; "Near-Field Optical-Scanning Microscopy"; Durig et al.; pp. 3381-3327.

*Primary Examiner*—David C. Nelms
*Attorney, Agent, or Firm*—Frishauf, Holtz, Goodman & Woodward

[57] ABSTRACT

A hole is formed in a silicon substrate, passing through the substrate. An insulating film is formed on one face of the silicon substrate and one open end of the hole is thus closed by the insulating film. An antireflection film is attached to that area of the insulating film by which the one open end of the hole is closed. An optical fiber is fitted and fixed in the hole. An optically-transparent conical probe is formed on the area of the insulating film which corresponds to the hole in the silicon substrate and the probe is coated by a metal film while leaving a tip of the probe not coated. A fine aperture is thus formed at the tip of the probe to allow light to enter into the probe through the fine aperture. The metal film prevents light reflected from entering into the probe and light from being leaked from the probe, and it is connected to an electrode to use tunnel current to position the fine aperture near a sample.

19 Claims, 25 Drawing Sheets

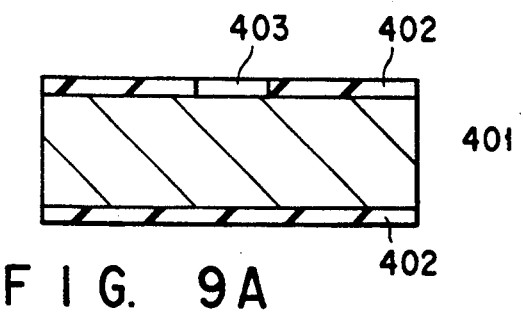
F I G. 9A
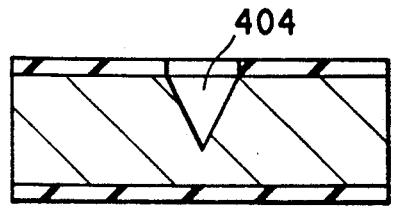
F I G. 9B
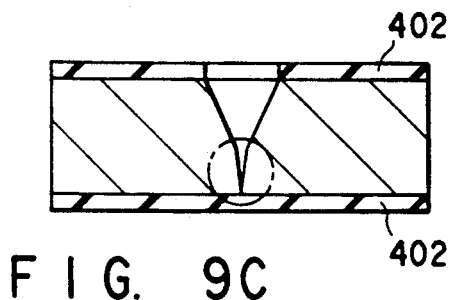
F I G. 9C
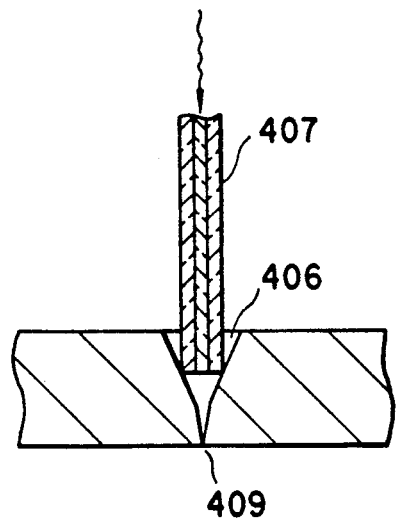
F I G. 9E
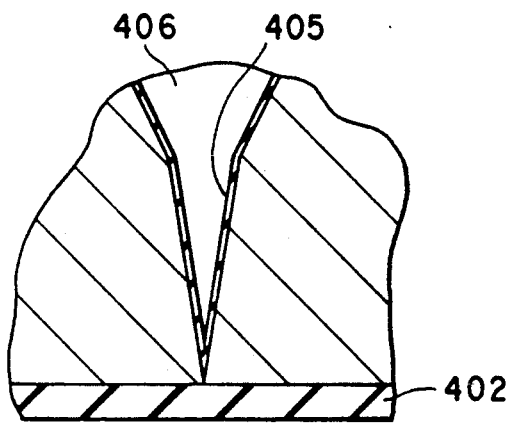
F I G. 9D

PROBE UNIT FOR NEAR-FIELD OPTICAL SCANNING MICROSCOPE

BACKGROUND OF THE INVENTION

1. Field of the Invention

The present invention relates to a near-field optical scanning microscope having an extremely high resolution.

2. Description of the Related Art

When matter of sub-micron size is viewed through the normal optical microscope, this viewing is limited because of light diffraction and the positional resolution of matter to an extent smaller than about λ/2 has been regarded as being impossible. In the case of a near-field microscope wherein light is shot to a sample at a position separated from the sample surface by several nm and light thus passed through or reflected from the sample is detected by a photomultiplier tube, while using evanescent light irradiated through a fine pinhole, however, it has been made possible to view any pattern having a size of about 0.1 μm.

FIG. 45 shows the near-field scanning microscope reported by U. Düring et al. A sample is arranged in an xy-scanner system driven by a bimorph and a probe for radiating light to the sample is arranged adjacent to the sample in the case of this microscope. The probe has an aperture at the tip thereof and the evanescent light is shot from the probe through this aperture. FIG. 46 shows logarithmic strengths of evanescent light relative to distances measured from the aperture at the tip of the probe. Normalized distance $\zeta$ obtained by dividing a distance (z) of the sample measure from the aperture at the tip of the probe by a diameter (a) of the aperture is plotted on the axis of abscissas. The relation of light strengths relative to the normalized distance $\zeta$ can be shown by three areas (which correspond to PROX, NEAR AND FAR in FIG. 46) and when $\zeta = 0.3 - 1$ (which corresponds to an actual distance of 2-5 nm), the strength of evanescent light becomes substantially certain. In the case of the near-field microscope shown in FIG. 45, the distance between the sample and the probe is set to be at the area of PROX. Therefore, the sample is conductive and the position of the probe is controlled in a direction (z) in such a way that tunnel current flowing between the conductive sample and the probe becomes certain.

The evanescent light entering into the sample through the tip of the probe is condensed by an objective and amplified by a photomultiplier tube. Light including optical information on the sample surface is condensed in this manner by the objective. When the sample is xy-scanned while keeping the distance between the probe and the sample at the area of PROX, the optical image of near-field can be obtained. The positional resolution of the near-field optical microscope is determined by the size of the aperture at the tip of the probe, the sensibility of the detectors used, as well as other factors, and it is expected that a resolution of about 20 nm can be actually obtained.

Matter having a size of sub-micron order can be viewed only by a technique manual which uses electrons such as SEM and TEM, and these techniques need a vacuum space and information obtained by these techniques is electrical in nature. Recently, other techniques of using tunnel current such as STM and AFM and atomic force are being practiced. Sub-micron observation by light can be carried out even in the air and any matter such as the human body and cells, difficult to be viewed, can be made objects for this observation. Therefore, this sub-micron observation by light can be applied to a wide range of fields.

In the case of the near-field microscope, piezo elements and bimorphs used by STM and other techniques can be used to position the probe in the direction (z) and the scanner system in directions (x) and (y), but it is difficult to make the probe through which the evanescent light is irradiated.

According to the above-described near-field microscopes, probes made by the following manner are used. As shown in FIG. 47A, an aluminium film is vapor-deposited on a quartz chip whose tip is made sharp by machining. The aluminium film thus deposited is then pressed against the sample at the tip portion thereof and crushed to form an aperture at the crushed tip portion. The probe made by this manner has a life of only several hours because the size of the aperture at its tip cannot be made certain and the diameter of the aperture is increased while it is being used (it is supposed that this is caused by the internal stress of aluminium).

SUMMARY OF THE INVENTION

The object of the present invention is therefore to provide a probe unit for the near-field microscope so as to enable a more stable observation to be made relative to any of samples.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIGS. 9A through 9E are views showing how the probe unit according to a fourth embodiment of the present invention is made;

DETAILED DESCRIPTION OF THE PREFERRED EMBODIMENTS

Figure 1:
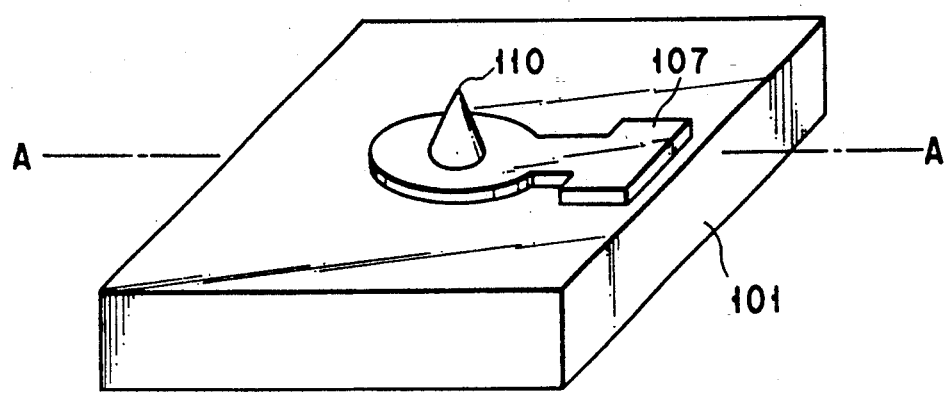
FIG. 1 is a perspective view showing the probe unit according to a first embodiment of the present invention.
Figure 2:
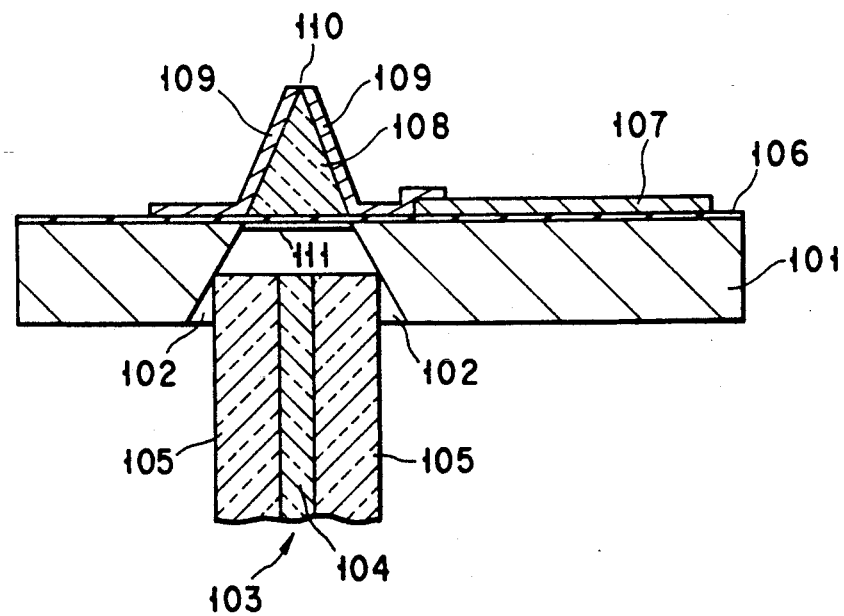
FIG. 2 is a sectional view taken along a line A—A in FIG. 1.

A first embodiment of the present invention will be described with reference to the accompanying drawings. As shown in FIGS. 1 and 2, the probe unit according to the first embodiment of the present invention has a silicon substrate 101 and an opening 102 is formed passing through the silicon substrate 101. An insulating film 106 is formed on the silicon substrate 101 and the opening 102 of the silicon substrate 101 is closed by the insulating film 106 at that side of the silicon substrate 101 on which the insulating film 106 is formed. An antireflection film 111 is formed on the underside of that area of the insulating film 106 by which the opening 102 is closed. An optical fiber 103 having a core 104 and a cladding 105 round the core 104 is fitted and fixed in the opening 102, passing through an open side of the opening 102. An optically-transparent conical probe 108 is formed on the top of that area of the insulating film 106 by which the opening 102 is closed. The probe 108 is coated by a metal film 109, except leaving its tip uncoated, so that an aperture 110 can be formed at the tip of the probe 108. Light lead into the probe 108 through the optical fiber 103, therefore, is irradiated as evanescent light from the probe 108 through the aperture 110. The metal film 109 by which the probe 108 is coated is connected to an electrode 107, from which tunnel current is picked up to position the aperture 110 near a sample.

A second embodiment of the present invention which is an improvement of the first probe unit will be described referring to FIGS. 3 and 4. Same components as those in the first probe unit will be denoted by same reference numerals and description on these components will be omitted.

The optical fiber 103 fitted and fixed in the opening 102 of the silicon substrate 101 in the case of the first probe unit is single, as shown in FIG. 1, and when it is single, it is liable to be broken because stress is concentrated on its part which is bonded to the silicon substrate 101.

Figure 3:
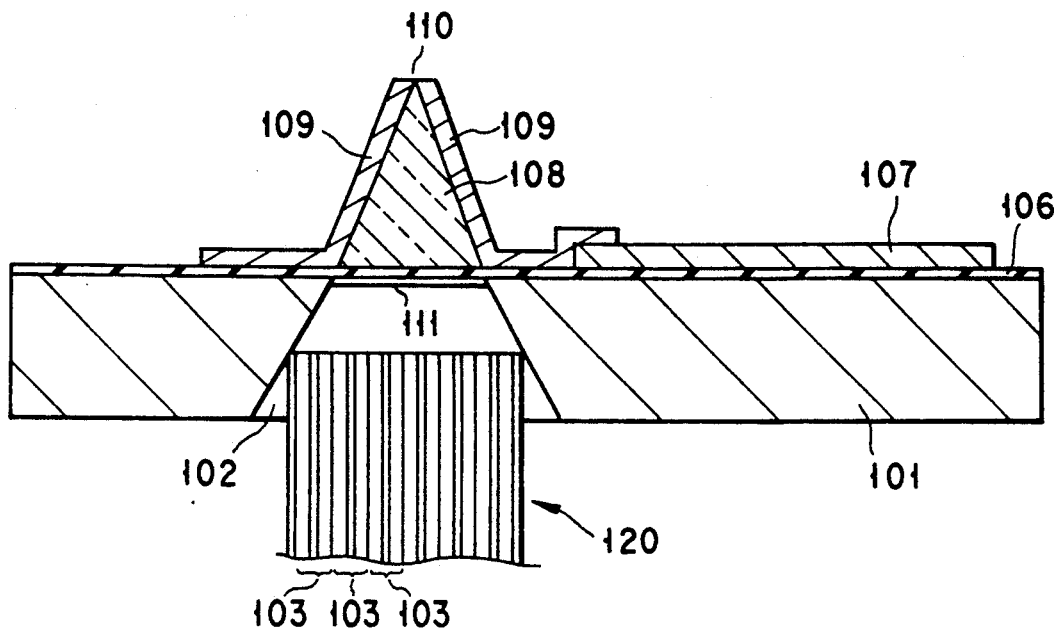
FIG. 3 is a sectional view showing the probe unit according to a second embodiment of the present invention.
Figure 4:
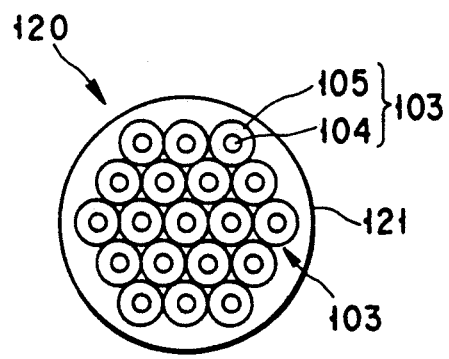
FIG. 4 is a sectional view showing a fiber bundle used by the probe unit shown in FIG. 3.

In the case of the second probe unit, therefore, not a single optical fiber but a fibers bundle 120 including plural optical fibers 103 is fitted and fixed in the opening 102 of the silicon substrate 101, as shown in FIG. 3. The fibers bundle 120 comprises plural optical fibers 103 each consisting of the core 104 and the cladding 105 and an outer coating 121 which coats a bundle of optical fibers 103, as shown in FIG. 4. Light introduced into the probe 108 through the plural optical fibers 103 is irradiated as evanescent light from the probe 108 through the aperture 110 at the tip of the probe 108. Even if some of the optical fibers 103 are broken at this time, light can be introduced into the probe 108 through the remaining unbroken optical fibers. The sample can be thus kept observed and the durability of the microscope can be increased accordingly.

Figure 5:
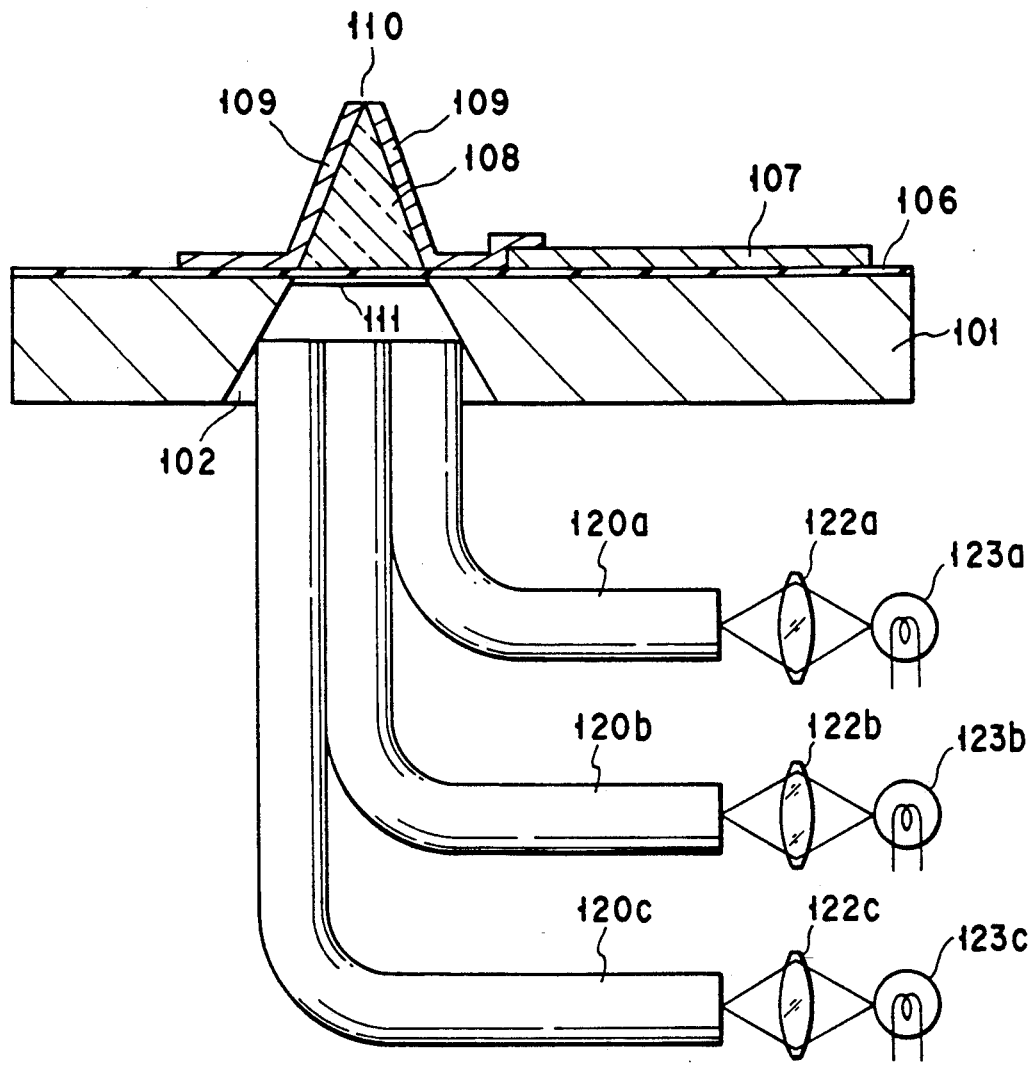
FIG. 5 shows a manner by which the probe unit shown in FIG. 3 is used.

When the fibers bundle is divided into three 120a, 120b and 120c and lights (e.g. red, green and blue ones), different in wavelength, are introduced from light sources 123a, 123b and 123c into these three fibers bundles through lenses 122a, 122b and 122c, as shown in FIG. 5, the sample can be selectively radiated by these lights.

Figure 6:
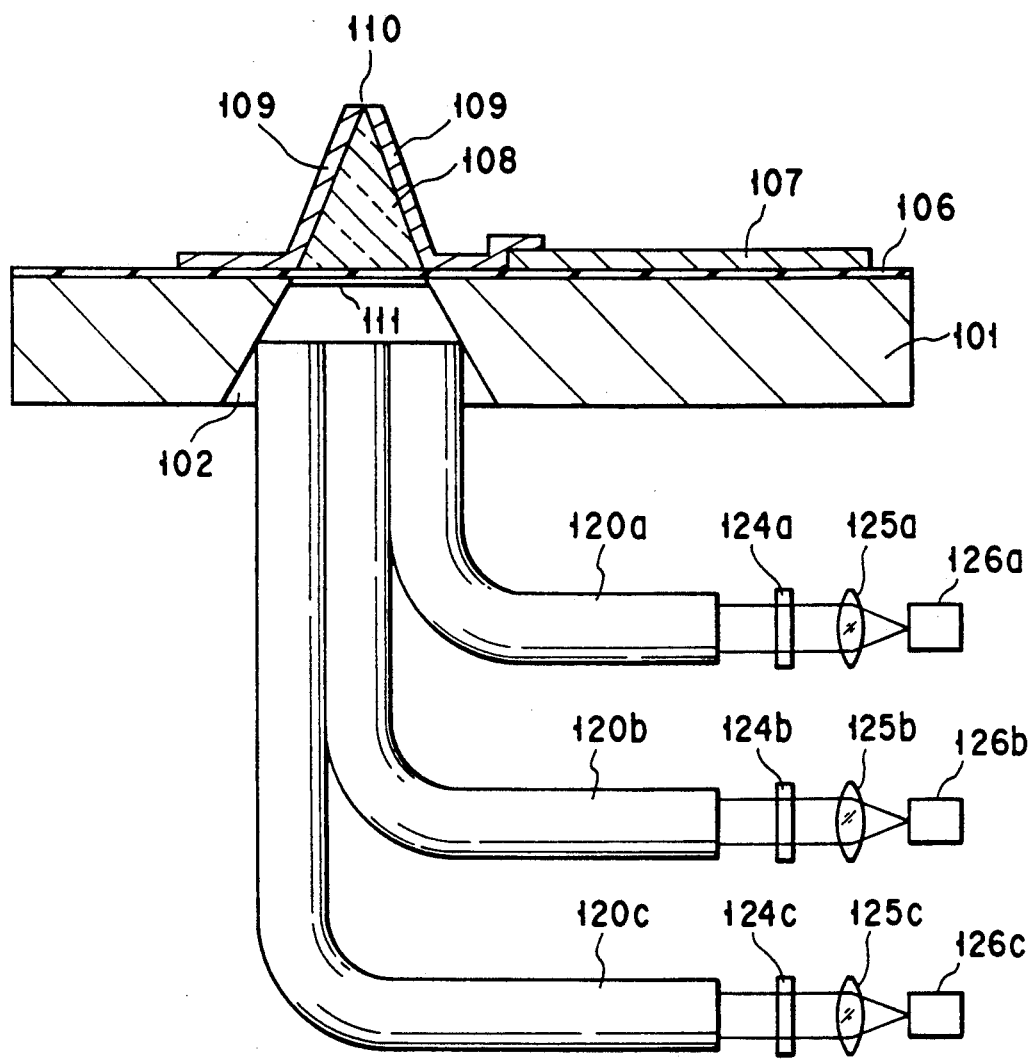
FIG. 6 shows another manner by which the probe unit shown in FIG. 3 is used.

When the fibers bundle is divided into three 120a, 120b, 120c and filters 124a, 124b and 124c, having different light-transmission characteristics, are arranged together with lenses 125a, 125b, 125c and light detectors 126a, 126b, 126c at rear ends of these fibers bundles, as shown in FIG. 6, light strengths different in wavelength can be measured and spectral data can be obtained.

Figure 7A:
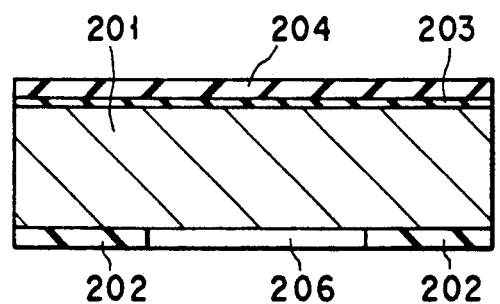
FIGS. 7A through 7H are views showing how the first probe unit is made.

Referring to FIGS. 7A through 7H, it will be described how the probe unit shown in FIG. 1 and 2 is made. As shown in FIG. 7A, a heat-oxidized film 203 and a silicon nitride film ($Si_3N_4$) 204 are formed on the top of a silicon substrate 201 which has an n- or p-crystal face (100). The refractive index of the silicon nitride film is usually about 2. When the heat-oxidized film (whose refractive index (n) equals to 1.46) has a film thickness of about 100 nm, therefore, it serves as an antireflection film relative to light having a wavelength $\lambda$ equal to 0.63 $\mu$m. A film 202 such as heat-oxidized one or Au/Cr film which can serves as a mask in the course of the following anisotropic etching is formed on the underside of the silicon substrate 201. A square opening 206 is formed in the film 202.

Figure 7B:
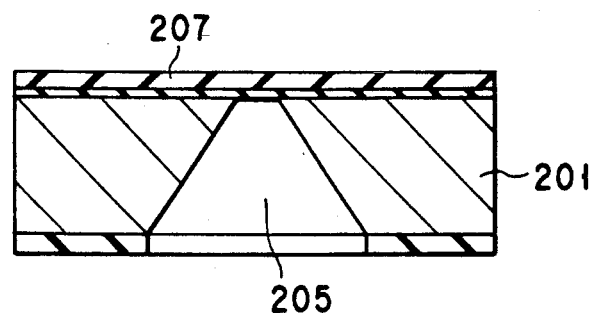

The silicon substrate 201 is then etched by anisotropic etching liquid such as KOH or ethylenediamine/pyrocatechol/water, as shown in FIG. 7B. The silicon nitride film 204 does not dissolve in the etching liquid in this case. Therefore, the silicon substrate 201 is etched from its underside while using the film 202 as the mask. An opening 205 shaped like a rectangular cone is thus formed in the silicon substrate 201. When the length (L) of one side of the opening 206 formed in the film 202 relative to the thickness (t) of the silicon substrate 201 is set $L > \sqrt{2}t$, opening 205 formed reaches the silicon nitride film 204. That area 207 of the silicon nitride film 204 which corresponds to the opening 205 can be however kept flat because the silicon nitride film 204 has a residual tensile stress of about 1 GPa.

Figure 7C:
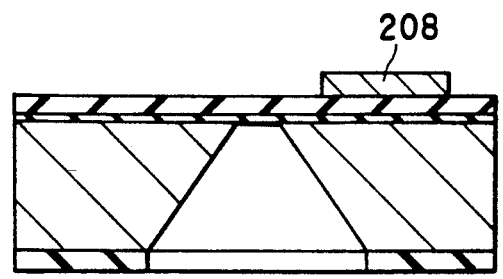

An electrode 208 is then formed on the silicon nitride film 204 by the photo-lithography, as shown in FIG. 7C.

Figure 7D:
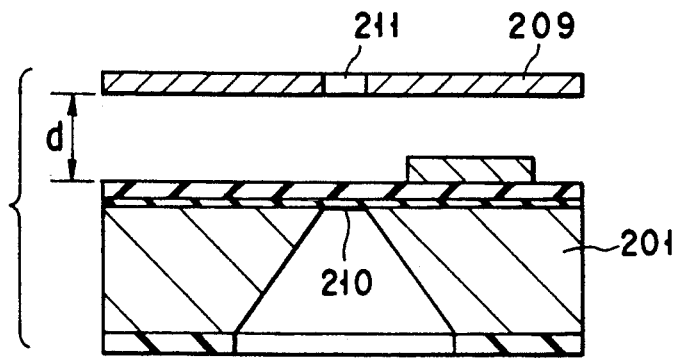

A mask 209 having a circular opening 211, larger than a top 210 of the opening 205, is arranged on the top side of the silicon substrate 201 with a distance (d) interposed between them, as shown in FIG. 7D.

Figure 7E:
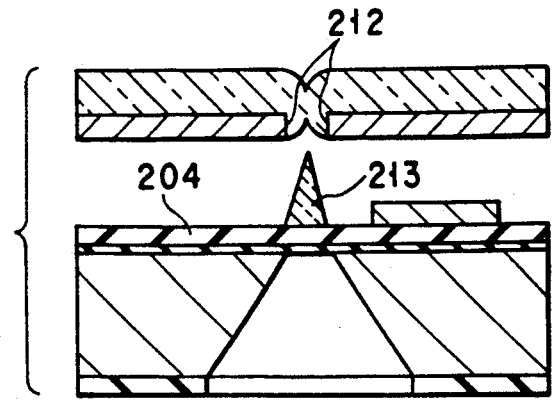

Glass is deposited on the silicon nitride film 204 through the mask 209 by the electronic beam vapor deposition or sputtering, as shown in FIG. 7E. Glass is also deposited on a side wall 212 of the opening 211 in the mask 209 during this process. The opening 211 becomes smaller and smaller accordingly and when it is closed by glass thus deposited, an optically-transparent probe 213 having a sharp tip and shaped like a cone is formed on the silicon nitride film 204.

Figure 7F:
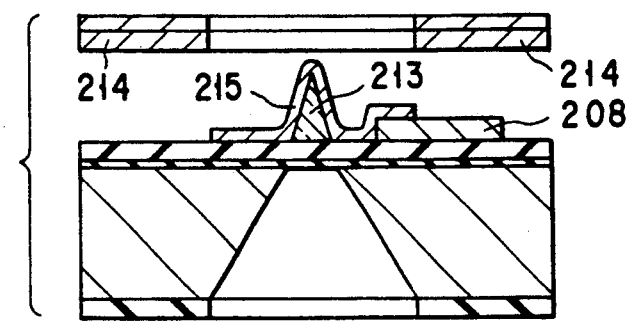

A mask 214 having a circular opening, larger in diameter than the bottom of the probe 213, is arranged positioning the probe 213 in the circular opening and metal is vapor-deposited on the silicon nitride film 204 through the mask 214 to form a metal film 215 which covers the probe 213 and a part of the electrode 208, as shown in FIG. 7F.

Figure 7G:
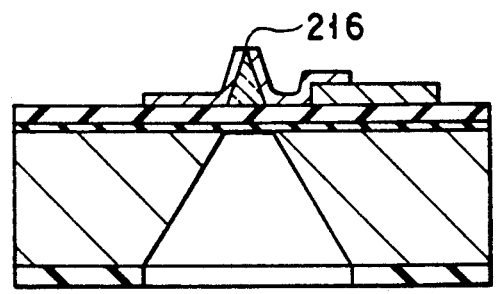

That area of the metal film 215 which corresponds to the tip of the probe 213 is etched by a distance, equal to the thickness of the metal film 215, while using a physical manner such as the ion milling. An aperture 216 through which the tip of the probe 213 is exposed is thus formed, as shown in FIG. 7G. If necessary, a mask may be applied to this area of the metal film 215 during this etching process.

Figure 7H:
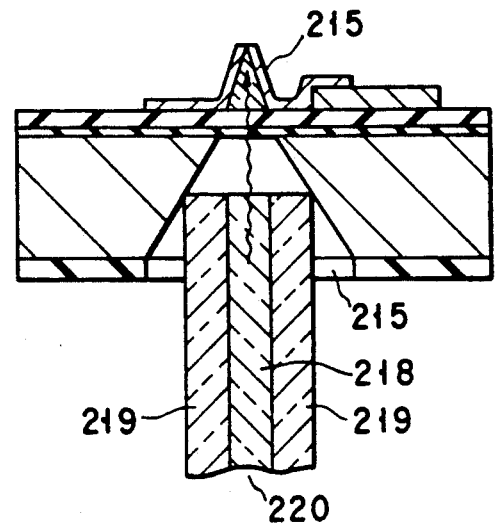

An optical fiber 220 having a core 218 and a cladding 219 round the core is fitted into the opening 205 in the silicon substrate 201 and fixed there by adhesive, as shown in FIG. 7H. The making of the probe unit shown in FIGS. 1 and 2 is thus finished.

Although the electrode 208 has been formed prior to the forming of metal film 215 in the above case, they may be vapor-deposited at the same time, using an electrode-pattern-provided mask, when metal is to be deposited on the probe 213.

A third embodiment of the present invention and its making manner will be described with reference to FIGS. 8A through 8H. This third embodiment is different from the first one in that the metal film on the probe and the silicon substrate are electrically connected to each other to pick up tunnel current via the silicon substrate.

Figure 8A:
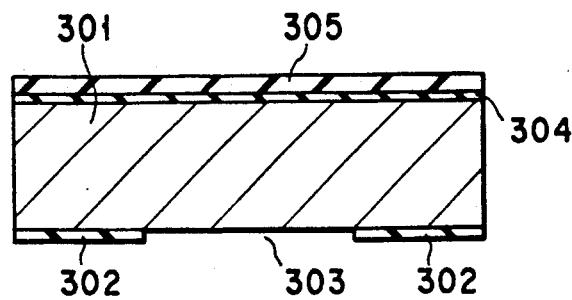
FIGS. 8A through 8H are views showing how the probe unit according to a third embodiment of the present invention is made.

As shown in FIG. 8A, a heat-oxidized film 304 and a silicon nitride film 305 are formed to a thickness of about 0.1 $\mu$m on the top of an n- or p-silicon substrate 301. The silicon substrate 301 used has an impurity concentration higher than about $10^{17}$ cm$^{-3}$. A metal film 302 such as Au/Cr film which allows ohmic contact to be easily established is formed on the underside of the silicon substrate 301 and a square opening 303 is formed in the metal film 302.

Figure 8B:
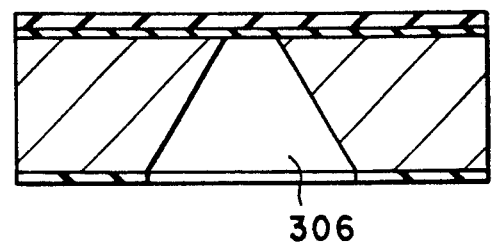

The anisotropic etching is applied to the silicon substrate 301, using the metal and silicon nitride films 302 and 305 as masks, to form a rectangular-cone shaped opening 306 in the silicon substrate 301, as shown in FIG. 8B.

Figure 8C:
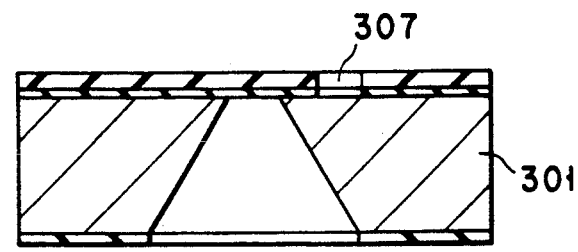

An opening 307 is formed in the insulating films 304 and 305 on the top of the silicon substrate 301 by the photo-lithography to expose a part of the silicon substrate 301, as shown in FIG. 8C.

Figure 8D:
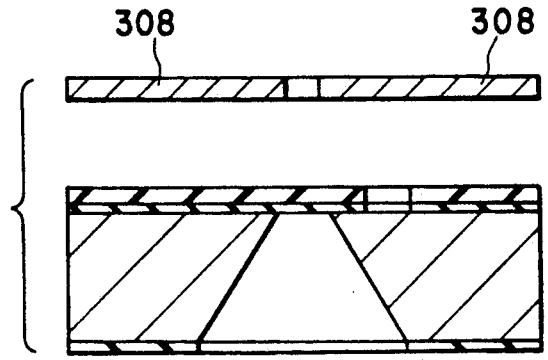
Figure 8E:
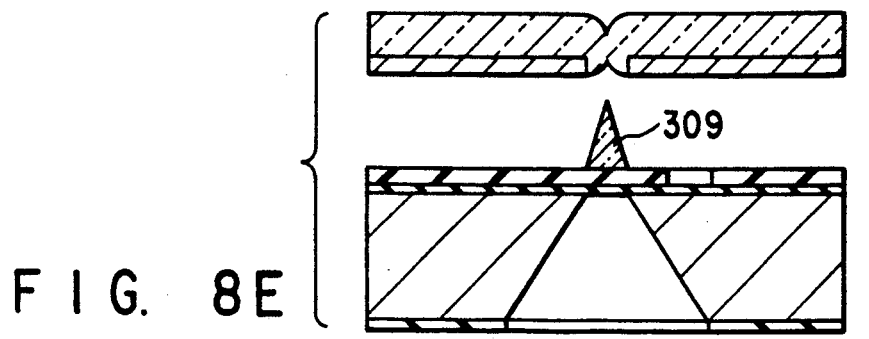

A mask 308 having a circular opening is arranged on the top side of the silicon substrate 301, as shown in FIG. 8D, and glass is deposited on the silicon nitride film 305 through the mask 308 by the manner such as the electronic beam vapor deposition or sputtering to form a conical probe 309, as shown in FIG. 8E.

Figure 8F:
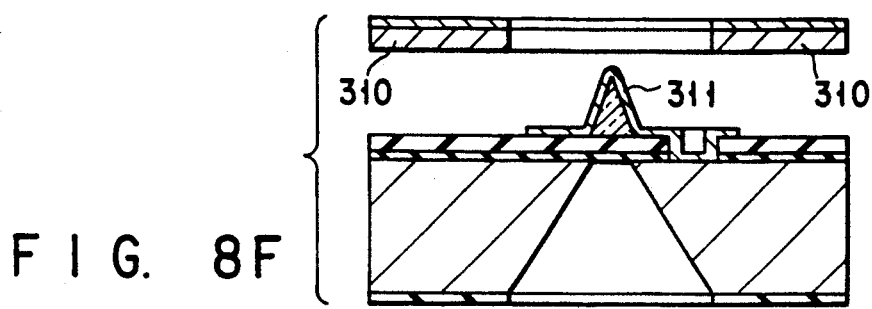

Metal is vapor-deposited through a mask 310 to form a metal film 311 which covers the probe 30 and the opening 307, as shown in FIG. 8F. The metal film 311 is made of such a material that allows easy ohmic contact with the silicon substrate 301.

Figure 8G:
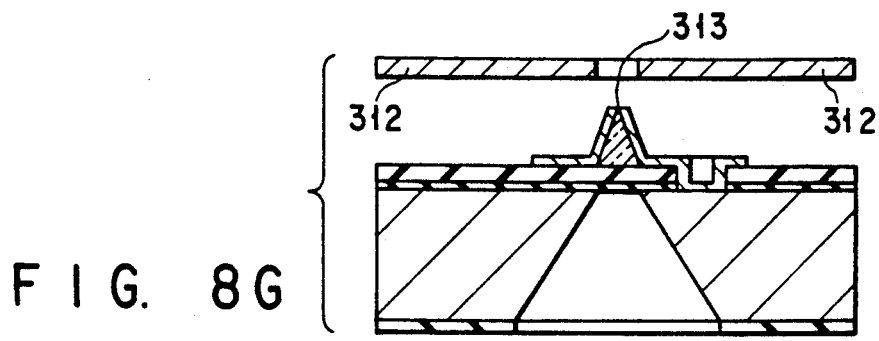

That area of the metal film 311 which corresponds to the tip of the probe 309 is etched through a mask 312 by a distance, equal to the thickness of the metal film 311, according to the dry etching such as the ion milling to form an aperture 313 through which the tip of the probe 309 is exposed, as shown in FIG. 8G.

Figure 8H:
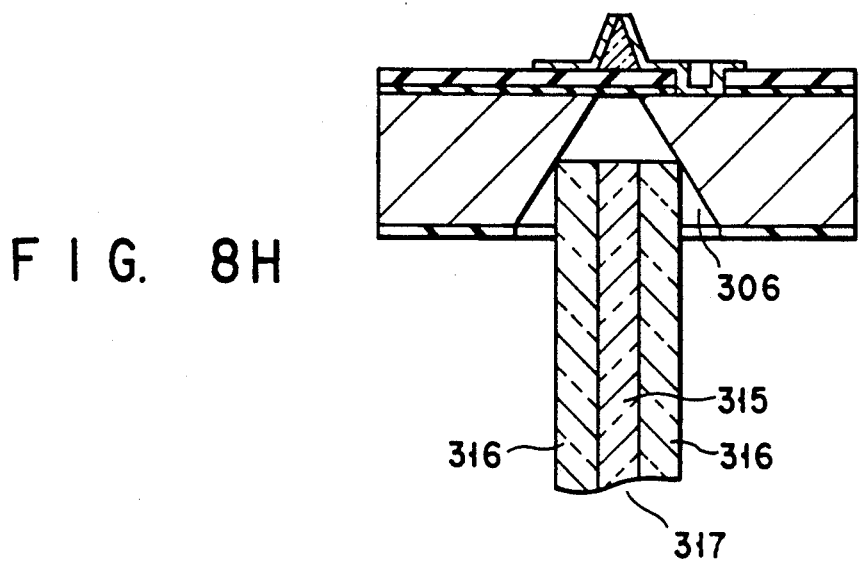

An optical fiber 317 having a core 315 and a cladding 316 round the core is fitted into the opening 306 in the silicon substrate 301 and fixed there by adhesive, as shown in FIG. 8H.

A fourth embodiment of the present invention and its making manner will be described with reference to FIGS. 9A through 9E. In the case of this embodiment, a through-hole is formed in the silicon substrate, while using the anisotropic etching together with the reactive ion etching by which a protection film is formed on side walls of the through-hole, and light introduced through an optical fiber is lead into the through-hole through a large-diameter portion thereof and emitted from the hole through an extremely-small-diameter portion thereof.

As shown in FIG. 9A, a heat-oxidized film 402 is formed on both of the top and underside of a silicon substrate 401 which has an n- or p-crystal face (100) and a square opening 403 is formed in the heat-oxidized film 402 on the top of the silicon substrate 401. The length (L) of one side of the opening 403 relative to the thickness (t) of the silicon substrate 401 is selected to be $L < \sqrt{2}t$.

The anisotropic etching is applied to the silicon substrate 401, while using the heat-oxidized film 402 as a mask, to form a hole 404 shaped like a rectangular cone and having four side walls each of which is a crystal face (111), as shown in FIG. 9B. The tip of the hole 404 terminates in the silicon substrate 401 because the length (L) of one side of the opening 403 is set $L < \sqrt{2}t$. When the anisotropic etching is applied to the silicon substrate 401, providing that the thickness of the substrate be 400 μm and that the one side of the opening having a length of 552 μm, for example, the tip of the hole 404 will terminate in the silicon substrate at a depth of 10 μm measure from the underside of the substrate.

The reactive ion etching is then applied to the silicon substrate 401 in such a way that a protection film 405 is deposited on the side walls of the hole 404, and a through-hole 406 is thus formed in the silicon substrate 401, as shown in FIGS. 9C and 9D in which FIG. 9D shows that part of the through-hole which is enclosed by a circle in FIG. 9C enlarged. According to the reactive ion etching by which the protection film 405 is deposited on the side walls of the through-hole, the tip of the hole which is subject to ion impact is selectively etched to form a pinhole of sub-micron size therein.

The side protection film 405 on the through-hole 406 and the heat-oxidized films 402 on the substrate 401 are removed and an optical fiber 407 is fitted and fixed in the through-hole 406 of the substrate 401, as shown in FIG. 9E. Light introduced through the optical fiber 407 can be thus irradiated as evanescent light from the through-hole 406 through a fine aperture 409 which is formed at the tip of the through-hole 406.

Figure 10:
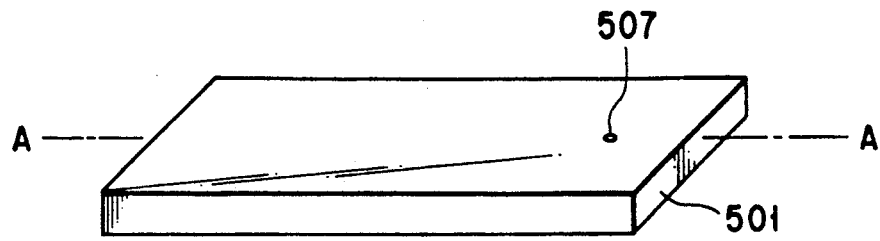
FIG. 10 shows the appearance of the probe unit according to a fifth embodiment of the present invention.
Figure 11:
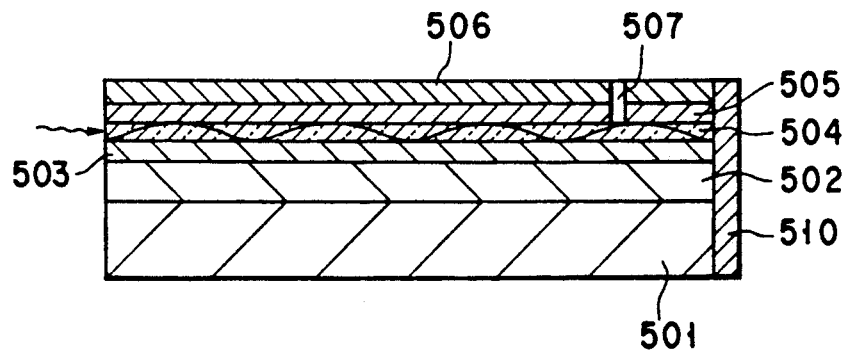
FIG. 11 is a sectional view taken along a line A—A in FIG. 10.
Figure 12:
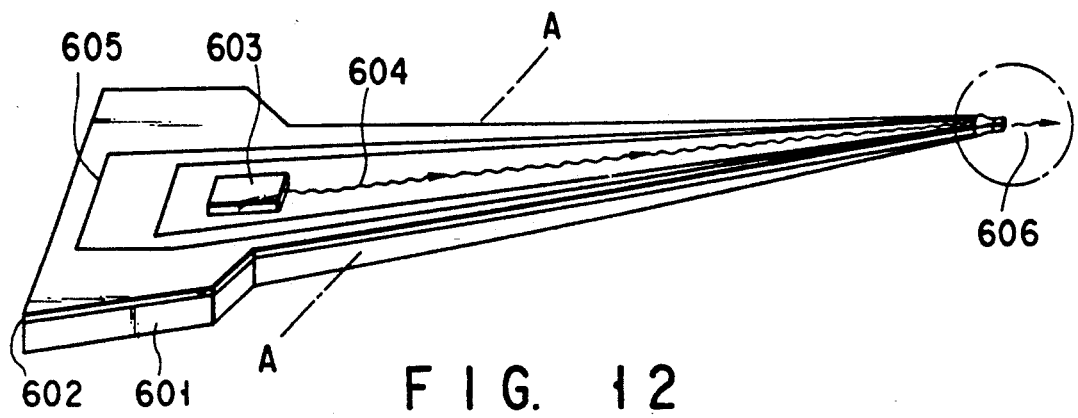
FIG. 12 is a perspective view showing the probe unit according to a sixth embodiment of the present invention.
Figure 13:
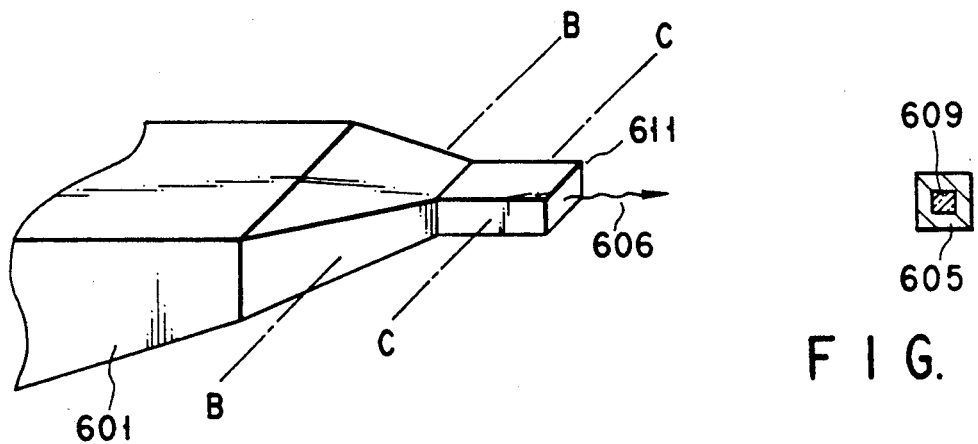
FIG. 13 is an enlarged view showing that part of the sixth probe unit which is shown in a circle in FIG. 12.
Figure 16:
FIG. 16 is a sectional view taken along a line C—C in FIG. 13.
Figure 14:
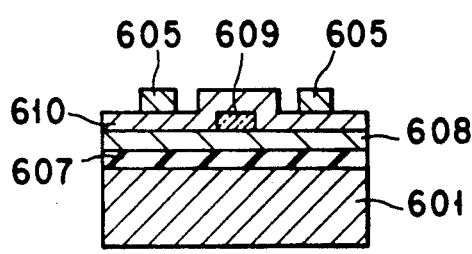
FIG. 14 is a sectional view taken along a line A—A in FIG. 12.
Figure 15:
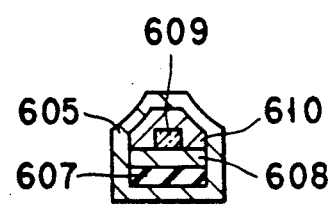
FIG. 15 is a sectional view taken along a line B—B in FIG. 13.

A fifth embodiment of the present invention will be described referring to FIGS. 10 and 11. A buffer layer 502, a first clad layer 503, a core layer 504, a second clad layer 505 and a metal film 506 are laminated on a substrate 501. A metal or light absorbing film 510 is formed on an end face of this lamination. A pinhole 507 is formed in the metal film 506 and the second clad layer 505, reaching the core layer 504. This pinhole 507 is formed by the photo-lithography and has a diameter the same as the wavelength of light used. In the case of this fifth probe unit, light introduced into the core layer 504 can be irradiated as evanescent light through the pinhole 507. In addition, the light propagating medium is a light waveguide of the flat type in this case. The pinhole having a diameter smaller than the wavelength of light can be thus formed by the photo-lithography while controlling its dimension well, thereby enabling optimum S/N and resolution to be obtained.

A sixth embodiment of the present invention will be described referring to FIGS. 12 through 16. A light waveguide 602 is formed on a silicon substrate 601 and an electrode 605 and a semiconductor layer 603 are formed on the light waveguide 602. The light waveguide 602 comprises a buffer layer 607, a first clad layer 608, core layer 609, and a second clad layer 610. The first and second clad layers 609 and 610 become thinner as they come nearer to the tip of the probe unit, thereby causing the light waveguide to be formed only by the core layer 609 at the tip of the probe unit. That portion of the core layer 609 which is at the tip of the probe unit is enclosed by the electrode 605. The electrode 605 is used as a tunnel current monitor terminal for controlling the distance between the tip of the probe unit and the sample. Light 604 shot from the semiconductor laser 603 is propagated through the core layer 609 in the light waveguide 602 and irradiated as evanescent light 606 through the tip of the probe unit.

Figure 17:
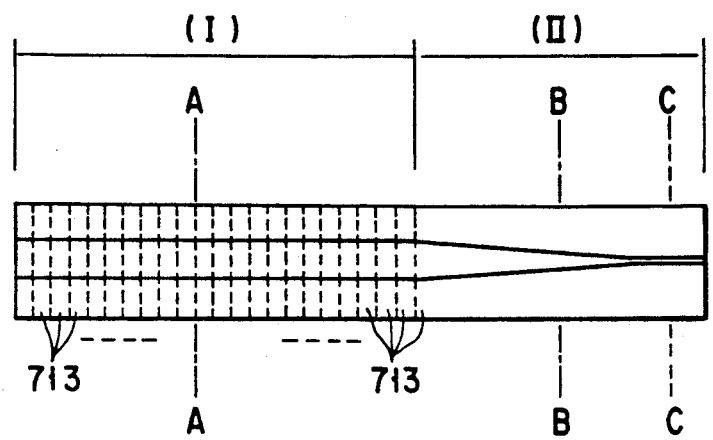
FIG. 17 is a plan view showing the probe unit according to a seventh embodiment of the present invention.
Figure 18:
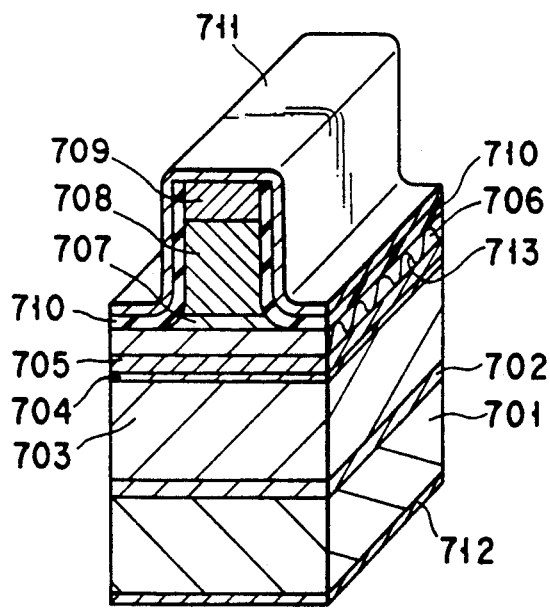
FIG. 18 is a sectional view taken along a line A—A in FIG. 17.
Figure 19:
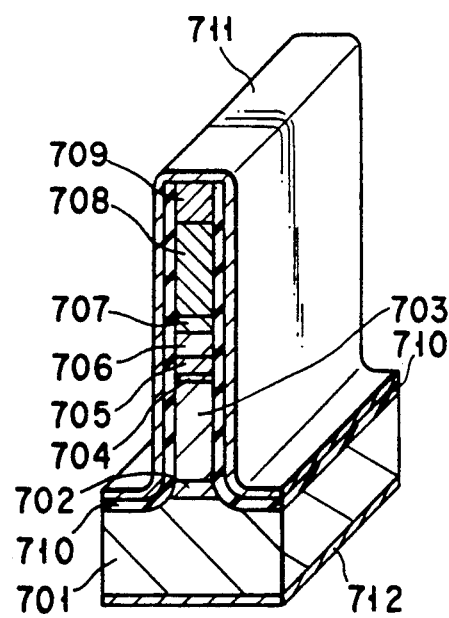
FIG. 19 is a sectional view taken along a line B—B in FIG. 17.

A seventh embodiment of the present invention will be described with reference to FIGS. 17 through 19. This embodiment is a DFB laser whose active layer has a width, same as or smaller than the wavelength of light, at its light irradiating end. FIG. 17 is a plan showing the DFB laser, FIG. 18 a sectional view taken along a line A—A in FIG. 17 and showing a DFB laser area (I) and FIG. 19 a sectional view taken along a line B—B in FIG. 17 and showing an area (II) where the ridge waveguide is made thinner in the traverse direction of the unit.

An n-GaAs buffer layer 702, an n-Al$_{0.4}$Ga$_{0.6}$As first clad layer 703, a GaAs active layer 704, p-Al$_{0.3}$Ga$_{0.7}$As barrier layer 705, a p-Al$_{0.15}$Ga$_{0.85}$As guide layer 706, a p-Al$_{0.3}$Ga$_{0.7}$As second clad layer 707, an n-Al$_{0.4}$Ga$_{0.6}$As third clad layer 708, and a p-GaAs contact layer 709 are laminated in this order on an n-GaAs substrate 701. The lamination thus formed is etched to the second clad layer 707 at the area (I) and to the substrate 701 at the area (II) to form a ridge. An insulating film 710 is formed, covering the ridge except the top thereof. A p-metal electrode 711 of Au/Cr or Au/Zn/Au is formed on the insulating film 710, contacting the contact layer 709, and an n-metal electrode 712 of Au/Ni/AuGe, for example is also formed, contacting the substrate 701. Diffraction gratings 713 having a cycle of $m \times \lambda/2n_{eff}$, wherein m=1, 2, ---, λ denotes the wavelength in the air and $n_{eff}$ represents the effective refraction index of the active layer are formed in the guide layer 706. The light waveguide becomes smaller and smaller in width and finally certain, having a width smaller than the wavelength of light, at the area (II) and it is cleft at that portion of it whose width becomes certain. Therefore, evanescent light can be irradiated through an end face of the semiconductor laser. According to the seventh probe unit, the light source can be positioned nearer to the sample, thereby making it unnecessary to use any optical fiber or system between the light source and the sample.

Figure 20:
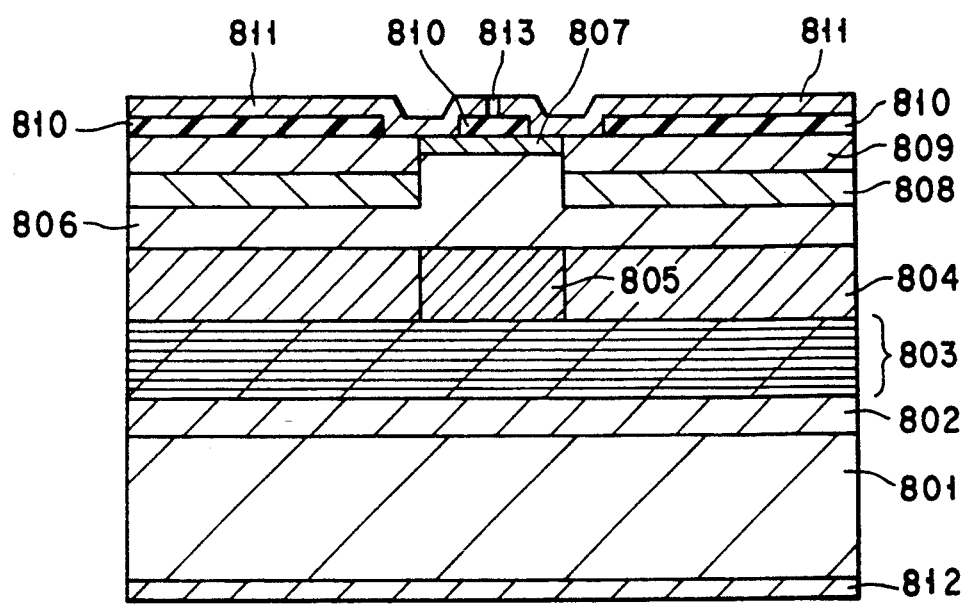
FIG. 20 shows the probe unit according to an eighth embodiment of the present invention.

An eighth embodiment of the present invention will be described with reference to FIG. 20. The light irradiating face of the laser is coated with a pinhole-provided film and evanescent light is irradiated through the pinhole in this case.

An n-GaAs buffer layer 802, an n-$Al_{0.1}Ga_{0.9}As/AlAs$ semiconductor multi-layer reflector 803, a p-GaAs layer 804, an active layer 805, a p-$Al_{0.3}Ga_{0.7}As$ clad layer 806, a p-$Al_{0.1}Ga_{0.9}As$ cap layer 807, an n-GaAs layer 808, a p-GaAs layer 809, an insulating film 810, and p-metal electrode 812 of Au/Zn/Au, for example, are laminated in this order on an n-GaAs substrate 801 and an n-metal electrode 812 of Au/Ni/AuGe, for example, is formed on the underside of the substrate 801. The n-GaAs layer 808 serves as a current pinching layer and electric charges injected from the p-metal electrode 811 into the active layer 805, passing through the p-GaAs 809, the p-$Al_{0.1}Ga_{0.9}As$ 807 and the p-$Al_{0.3}Ga_{0.7}As$ 806, are re-combined in this active layer 805 to emit light. This light emitted from the active layer 805 is reciprocated and stimulated between the semiconductor multi-layer 803 and the n-metal electrode 811, which form a resonator. A pinhole 813 having a diameter same as or smaller than the wavelength of light is formed at the center of the n-metal electrode 811 on the active layer 805 by the photolithography and evanescent light is irradiated through this pinhole 813. According to the eighth probe unit, the light source can be positioned nearer to the sample as seen in the seventh probe unit, thereby making it unnecessary to use any optical fiber or system between the light source and the sample.

The near-field microscope to which the above-described embodiments of the present invention can be applied is intended to shoot evanescent light through a fine aperture at the tip of the probe and radiate a sample with this evanescent light. However, there has been proposed another near-field microscope wherein an optically-transparent probe is positioned on the detected side of a sample so as to detect the evanescent light which is emitted through the sample when light radiates the sample at critical angle and wherein the evanescent light received through the sample is used to observe the sample. The near-field microscope of this type will be described referring to FIG. 21.

Figure 21:
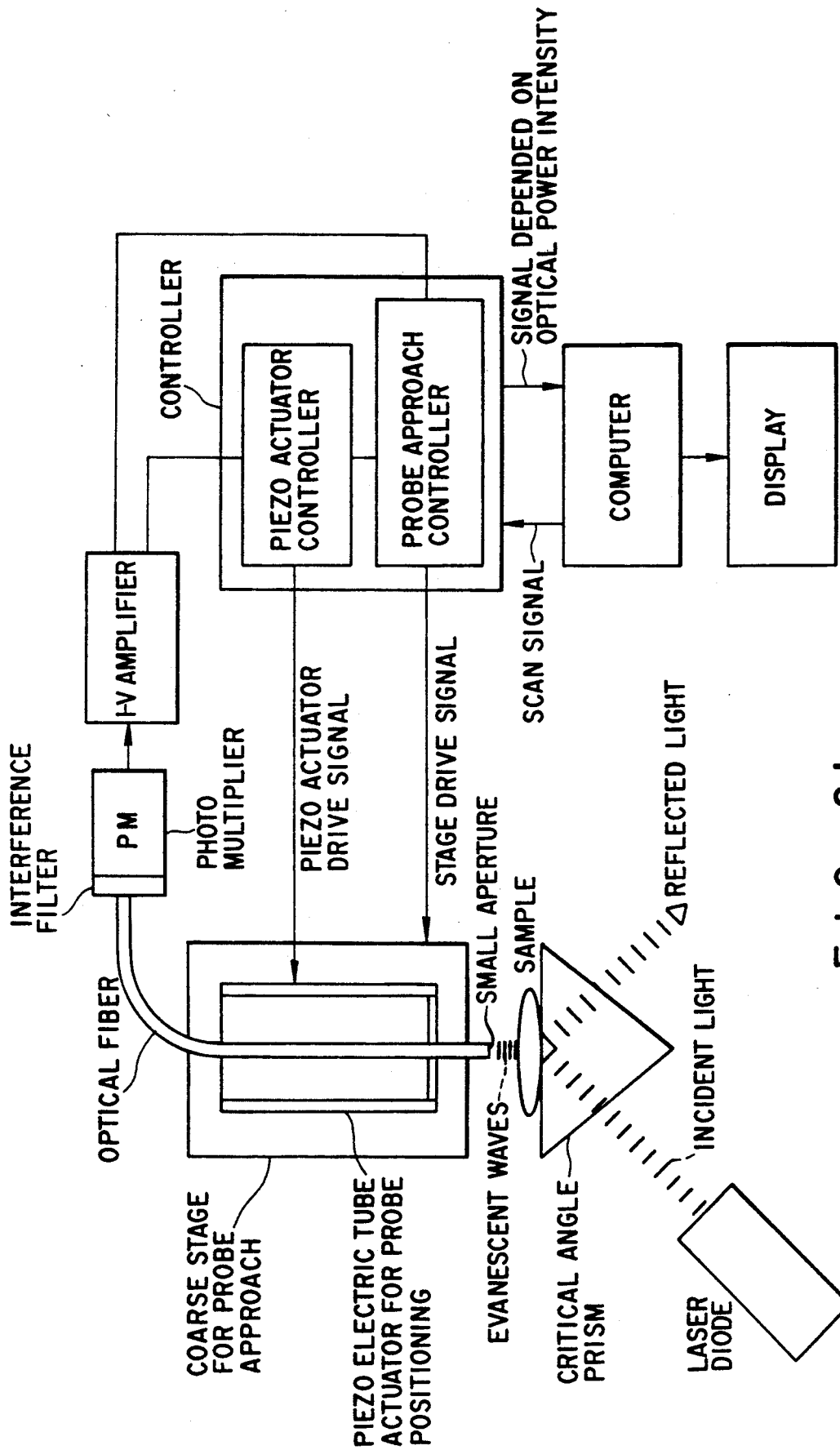
FIG. 21 shows an arrangement of the near-field microscope whose probe is positioned on the detected side of a sample.

As shown in FIG. 21, light emitted through a laser diode is shot to a sample through a critical prism. Most of the light is reflected but a part thereof is irradiated as evanescent light from the surface of the sample. This evanescent light enters into an optical fiber through a fine aperture, which is formed at the tip of the optical fiber, and this tip of the optical fiber serves as the probe of the microscope. The optical fiber is supported by a piezo electric tube actuator and it can scan the sample in directions x, y and z responsive to drive signal applied from a controller. The evanescent light which has entered into the optical fiber is lead into a photo-multiplier (PM) through an interference filter and converted to current signal, which is converted to voltage signal by an I-V amplifier. This voltage signal is imputted into the controller, used to servo-control the probe and also imputted into a host computer as information representing the uneven surface of the sample. The uneven surface of the sample is displayed on a display means on the basis of the information thus applied.

Some further embodiments of the present invention which can be applied to the near-field microscope of this type will be described.

Figure 22:
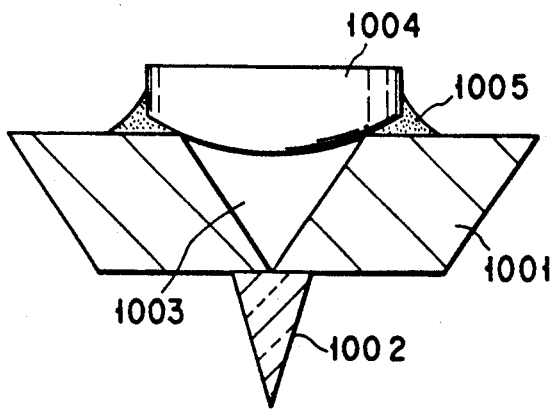
FIG. 22 is a sectional view showing the probe unit according to a ninth embodiment of the present invention.
Figure 23:
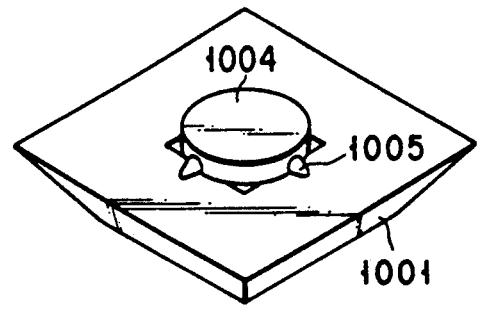
FIG. 23 is a perspective view showing the ninth probe unit.

A ninth embodiment of the present invention shown in FIGS. 22 and 23 includes a base member 1001 shaped like a rectangular trapezoid and an optically-transparent probe 1002 formed on the base member 1001 and shaped like a cone. The tip of the optically-transparent probe 1002 is regarded as an aperture. An opening 1003 is formed in the base member 1001, developing like a reversed pyramid from that face of the base member 1001 which is opposed to the probe-formed face thereof A micro-lens 1004 is fixed to the opening 1003 by adhesive 1005.

The usual thickness of a 4-inch silicon wafer is 520 $\mu$m. When the opening 1003 shaped like a reversed pyramid is formed in the silicon wafer by the anisotropic etching of the humidity type, with the tip of the opening reaching the opposite side of the silicon wafer, one side of the square opening 1003 has a length of about 700 $\mu$m. This is long enough to make stable the optical work of adjusting the convex face of the micro-lens 1004 to the opening 1003. It is preferable to make the micro-lens 1004 as small as possible to keep the whole of the probe unit small in size. Lenses each having a diameter smaller than 1 mm$\phi$ have been made in the field of the endoscope and others and they can be used in the case of the present invention.

According to the ninth embodiment, extremely faint evanescent light can be efficiently lead into an optical sensor through the aperture at the tip of the opening because the micro-lens is used. In addition, any optical adjusting work except of focusing the lens and adjusting the tilt of the lens is made unnecessary in the course of making probe units. This enables chips, which have a higher focusing rate, to be more easily made.

Figure 24:
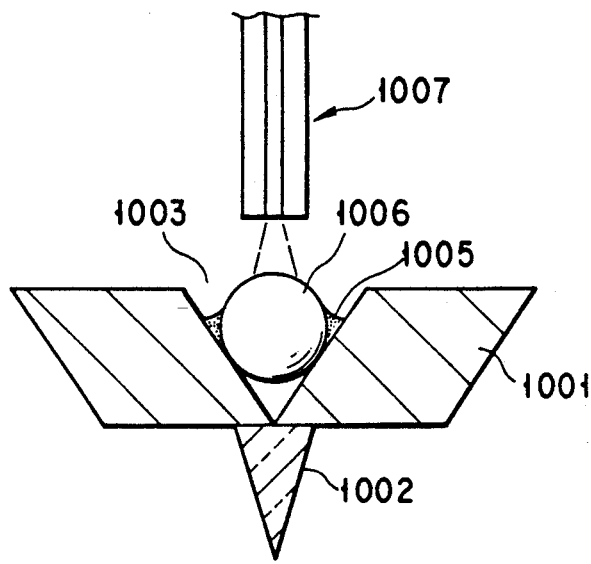
FIG. 24 shows the probe unit according to a tenth embodiment of the present invention.

A tenth embodiment of the present invention shown in FIG. 24 will be described. This tenth embodiment is same as the ninth one except that a ball lens is used instead of the micro-lens. A ball lens 1006 is dropped into the opening 1003 which is formed like a reversed pyramid in the base member 1001, and it is fixed there by adhesive 1005. As seen in the case of the ninth embodiment, therefore, the evanescent light can be efficiently lead into an optical fiber 1007. In addition, optical axis adjustment is made unnecessary but only to adjust the focus of the lens because the ball lens 1006 is used. This enables the probe unit to be more easily made than in the case of the ninth embodiment.

Figure 25:
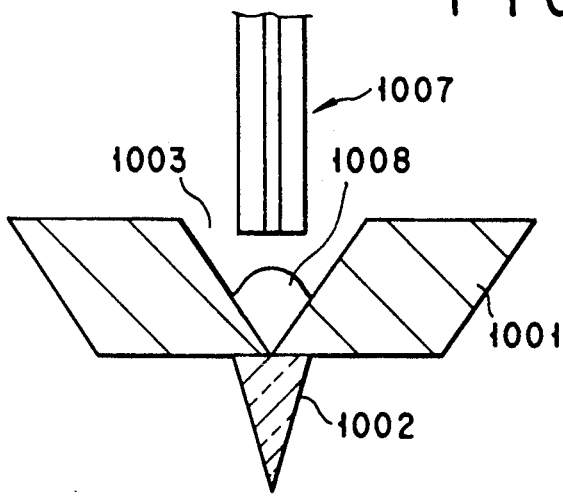
FIG. 25 is a sectional view showing the probe unit according to an eleventh embodiment of the present invention.
Figure 26:
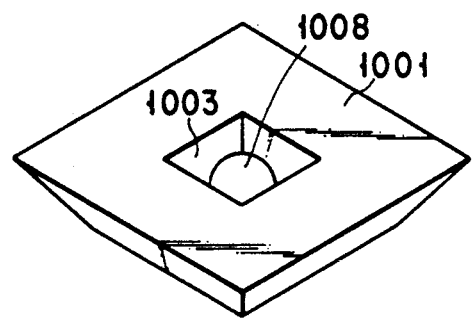
FIG. 26 is a perspective view showing the eleventh probe unit.

An eleventh embodiment of the present invention will be described with reference to FIGS. 25 and 26. A micro-lens 1008 made of resin is used, instead of the ball lens, in this case. The technique of making the micro-lens of resin and causing it to have a diameter smaller than several mm$\phi$ is used to make large the effective opening area of each of picture elements of the solid pickup such as CCD so as to enhance their sensitivity. The resin is caused to flow into the opening 1003 and formed as the lens integral to the opening by the photolithography.

Figure 27A:
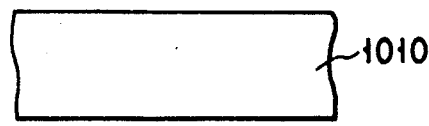
FIGS. 27A through 27I are views showing how the probe unit shown in FIGS. 25 and 26 is made.
Figure 27B:
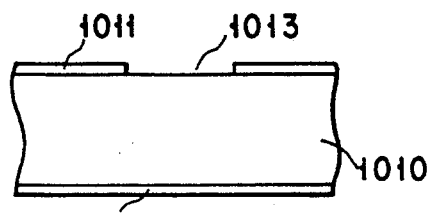
Figure 27C:
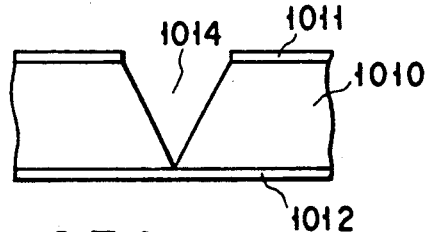
Figure 27D:
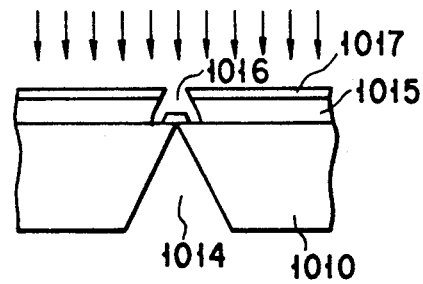
Figure 27E:
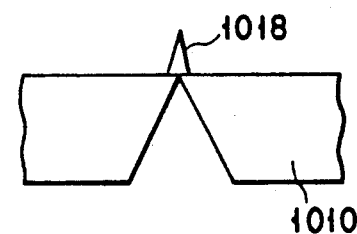
Figure 27F:
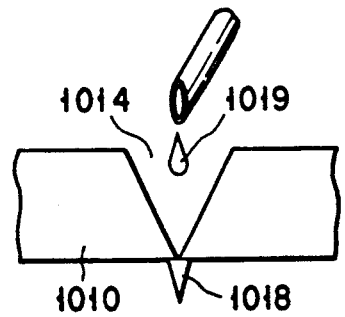
Figure 27G:
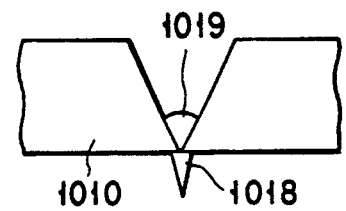
Figure 27H:
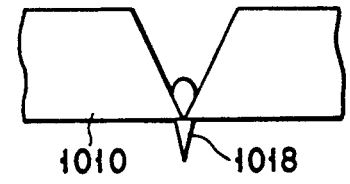
Figure 27I:
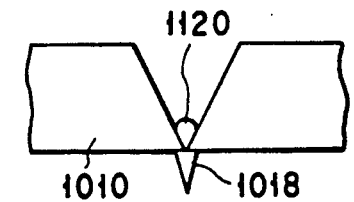

Referring to FIGS. 27A through 27I, it will be described how the eleventh embodiment is made. A silicon wafer 1010 whose main face is a crystal face of (100) is prepared (FIG. 27A). Insulating films 1011 and 1012 such as those made $SiO_2$ are formed on the top and underside of the silicon wafer 1010 and a rectangular opening 1013 is then formed in the insulating film 1011 (FIG. 27B). The anisotropic etching of the humidity type is applied to the silicon wafer 1010 while using the opening-formed insulating film 1011 as a mask to form a hole 1014, which is shaped like a reversed pyramid, in the silicon wafer 1010 (FIG. 27C). The insulating films 1011 and 1012 on the top and underside of the silicon wafer 1010 are removed and a resist layer 1015 having a circular hole 1016 is then formed on that face of the silicon wafer 1010 which corresponds to the tip of the hole 1014. Glass 1017 is deposited on the silicon wafer 1010 until it closes the hole 1016 of the resist layer 1015 (FIG. 27D). When the hole 1016 is filled with glass thus deposited and the resist layer 1015 is removed, a conical glass deposition or probe 1018 is obtained (FIG. 27E). After the probe 1018 is formed, it is subject to the HMDM process an an appropriate amount of lens forming resin (e.g. 0–703) 1019 is dropped into the hole 1014 by the dispenser (FIG. 27F). The lens forming resin 1019 thus dropped is then pre-baked for 90 seconds at a temperature of 90° C. (FIG. 27G). It is exposed and developed by ultraviolet rays whose wavelength is 436 nm, and it is shaped like a circle or rectangle (FIG. 27H). Finally, it is radiated by ultraviolet rays to increase its transmittance at the visible radiation range, and it is post-baked to a micro-lens 1120 whose shape is certain (FIG. 27I). The curvature and others of this micro-lens 1120 can be adjusted by the post-baking temperature and time. In order to make the focal length of the micro-lens long, an additional resin may be embedded flat in the hole 1014 before the micro-lens is formed.

Figure 28:
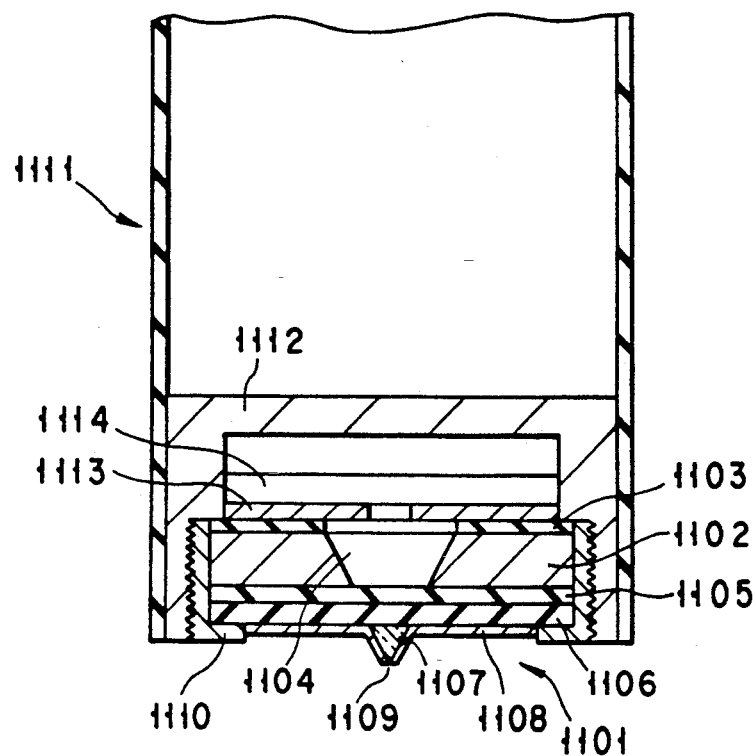
FIG. 28 is a sectional view showing the probe unit according to a twelfth embodiment of the present invention.

A twelfth embodiment of the present invention will be described referring to FIG. 28. A probe unit 1101 in this case has same structure as the first embodiment. It has a silicon substrate 1102 on one face of which an insulating film 1103 is formed, and a hole 1104 shaped like a reversed pyramid is formed in this lamination. Silicon oxide and nitride films 1105 and 1106 are laminated on the other face of the silicon substrate 1102 and the hole 1104 is closed by these laminated films. An optically-transparent probe 1107 is formed on that area of the silicon nitride film 1106 which corresponds to the hole 1104. Further, a metal film 1108 is formed to coat the probe 1107 and the silicon nitride film 1106 except a tip 1109 of the probe 1107.

The probe unit 1101 is housed in a cylindrical metal frame 1110, which has a thread round it and which is screwed into a support member 1112 arranged at the bottom of a piezo electric tube actuator 1111 for driving the probe unit 1101 in three-dimensional directions. A photo-diode 1114 is arranged on the probe unit 1101 in the support member 1112 with a space filter 1113 interposed between them and the space filter 1113 serves to selectively allow only the evanescent light to be passed through it.

According to the twelfth embodiment, the probe unit 1101 is made integral to the photoelectric conversion photo-diode 1114. The evanescent light coming out of the sample can be therefore efficiently detected.

Figure 29:
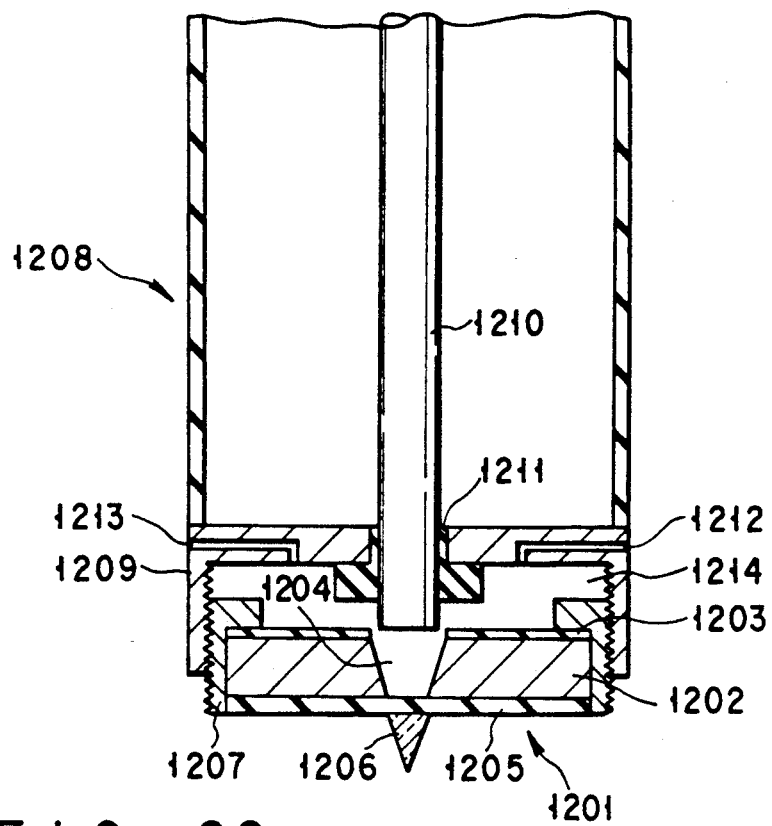
FIG. 29 is a sectional view showing the probe unit according to a thirteenth embodiment of the present invention.

A thirteenth embodiment of the present invention will be described with reference to FIG. 29. A probe unit 1201 in this case has a silicon substrate 1202 on one face of which an insulating film 1203 is formed, and a hole 1204 shaped like a reversed pyramid is formed in this lamination. A silicon oxide film 1205 is formed on the other face of the silicon substrate 1202 and the hole 1204 is closed by this silicon oxide film 1205. An optically-transparent probe 1106 is formed on that area of the silicon oxide film 1205 which corresponds to the hole 1204.

The probe unit 1201 is housed in a cylindrical metal frame 1207. A male thread is formed round the metal frame 1207. A cylindrical support member 1209 is arranged at the bottom of a piezo electric tube actuator 1208 which serves to drive the probe unit 1201 in three-dimensional directions. A female thread is formed on the inner circumference of the support member 1209. The metal frame 1207 can be thus screwed into the support member 1209. The metal frame 1207 shown in FIG. 29 is not completely screwed into the support member 1209 yet and when it is further screwed into the support member, its fixing into the support member can be finished. The support member 1209 has an opening at the center thereof and an optical fiber 1210 is fitted together with an elastic member 1211 into this opening and fixed there by the elastic member 1211. The support member 1209 also includes an injection hole 1212 through which matching (or coupling) oil is injected, and an air hole 1213. The matching oil injected through the injection hole 1212 stays in a space 1214 between the metal frame 1207 and the probe unit 1201 in the support member 1209. When the metal frame 1207 is completely screwed into the support member 1209, an excessive amount of the oil is caused to flow outside through the injection and air holes 1212 and 1213 while the oil left in the space 1214 combines the optical fiber 1210 with the probe 1206 via the silicon oxide film 1205 to reduce the propagation loss of the evanescent light.

Figure 30:
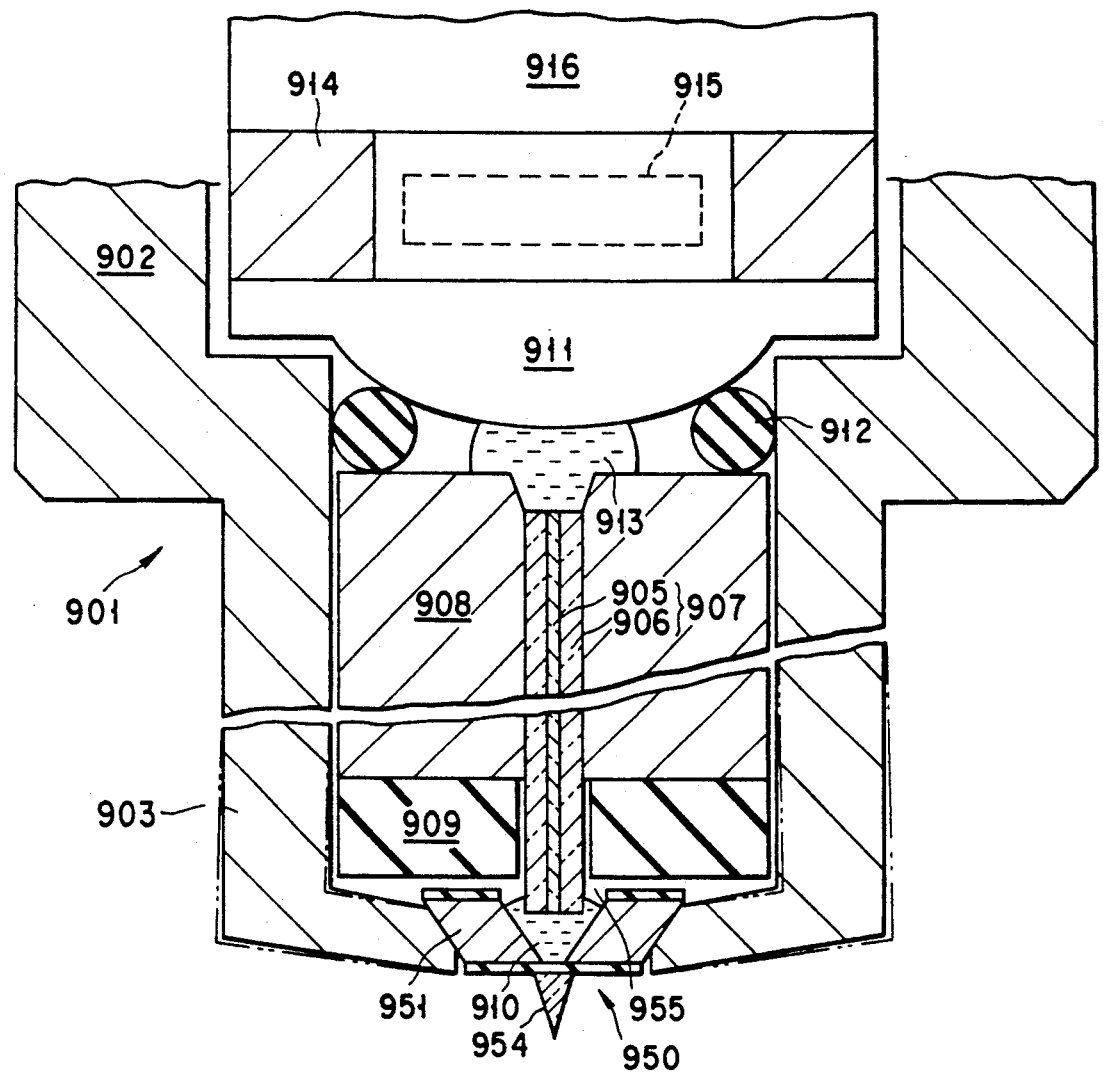
FIG. 30 is a sectional view showing the probe unit according to a fourteenth embodiment of the present invention.
Figure 33:
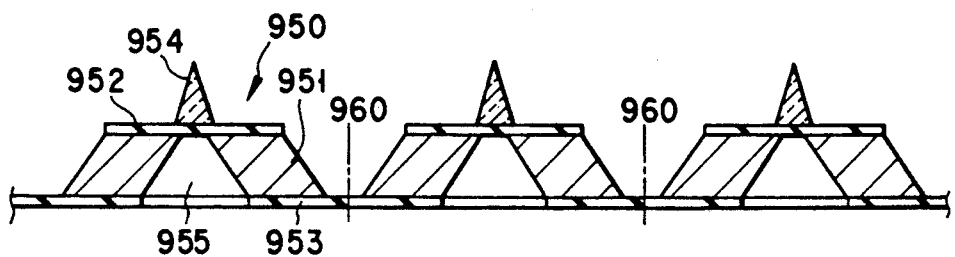
FIG. 33 is a sectional view taken along a line A—A in FIG. 32.
Figure 31:
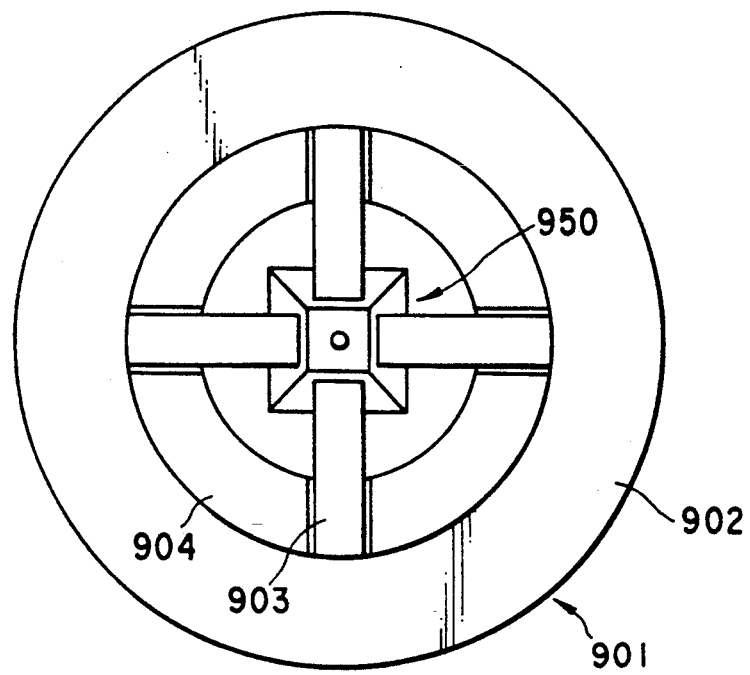
FIG. 31 shows the fourteenth probe unit viewed from the bottom side of the unit.

A fourteenth embodiment of the present invention will be described. As shown in FIGS. 30 and 31, an exchangeable probe unit 950 is housed and held in a probe holder 901. The probe holder 901 includes a cylindrical housing section 902, four claws 903 extending from the bottom of the housing section 902, and walls 904 each standing between the two adjacent claws 903. The probe unit 950 has a base member 951 shaped like a rectangular trapezoid and an optically-transparent probe 955 formed on the base member 951 and shaped like a cone. A rectangular hole 955 is formed in that area of the base member 901 which corresponds to the probe 954. Each of the claws 903 of the probe holder 901 is made elastic and its front end is so tilted as to face-contact the outer face of its corresponding side wall of the base member 951 of the probe unit 950. A pole-like sleeve 908 is housed in a space formed by the claws 903 and the walls 904 of the probe holder 901. An optical fiber 907 comprising a core 905 and a clad layer 906 extends along the axial center line of the sleeve 908 and a rubber washer 909 is attached to the underside of the sleeve 908. The lower end of the optical fiber 908 is projected downwards from the underside of the rubber washer 909 and positioned in the hole 955 when the probe unit 950 is reliably fixed in the probe holder 901. The optical fiber 907 is optically coupled to the probe 954 through coupling oil 910. A condenser 911 is arranged above the sleeve 908 with an O-ring 912 interposed between them and the condenser 911 is coupled to the optical fiber 907 through coupling oil 913. A photo-sensor 916 is positioned above the condenser 911 through a spacer 914. When polarizing characteristics are to be detected, a rotary polarizing plate which is shown by a broken line in FIG. 30 is arranged between the condenser 911 and the photo-sensor 916. The probe unit 950 shown in FIG. 30 is about to be reliable held in the probe holder 901 and it is reliably held in the probe holder 901 when the condenser 911 is pushed down until the rubber washer 909 is struck against it. When it is pushed down, the elastic claws 903 of the probe holder 901 are a little spread as shown by two-dot and dash lines. It can be thus reliably fixed by the rubber washer 909 and the elastic claws 903 of the probe holder 901.

Figure 32:
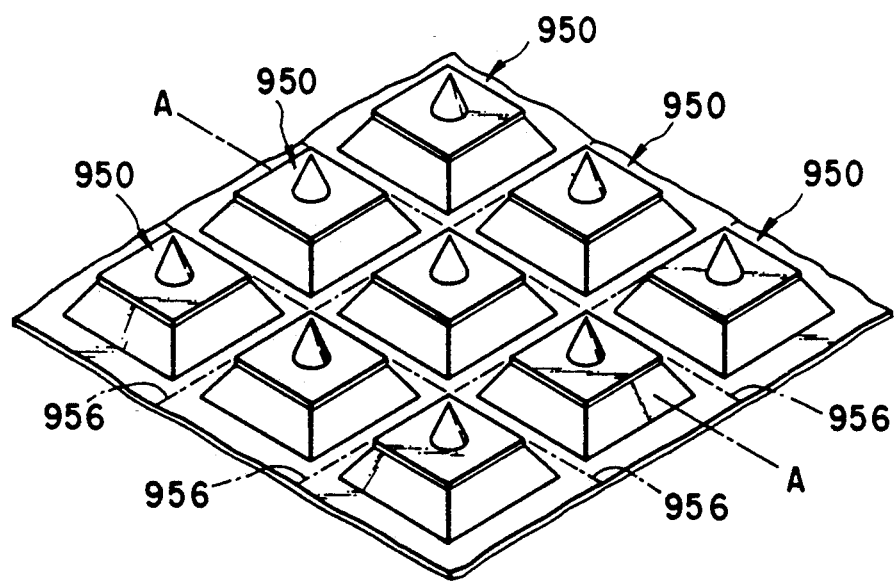
FIG. 32 shows the probe units used in FIG. 30.

A plurality of the probe unit 950 are made at the same time by the semiconductor process, as shown in FIG. 32 and 33. When they are to be used, they are divided into individual ones by cutting an insulating film 953, by which they are connected to one another, along cutting lines 956. They are made by fundamentally same manner as in the case of the first embodiment. The making manner will be briefly described with reference to FIGS. 34A through 34D.

Figure 34A:
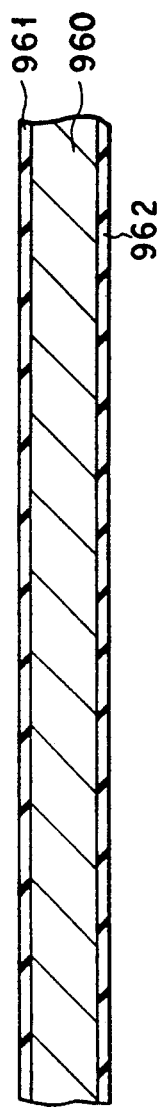
FIGS. 34A through 34D are views showing how the probe units in FIG. 32 are made.
Figure 34B:
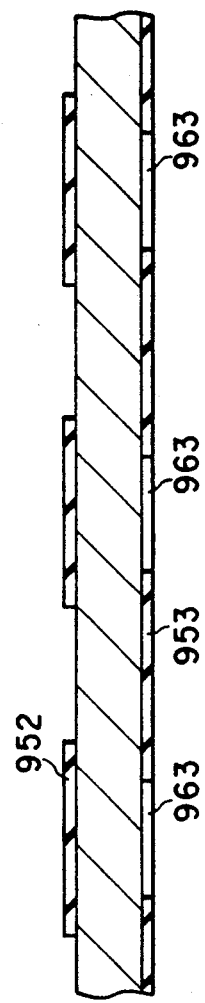
Figure 34C:
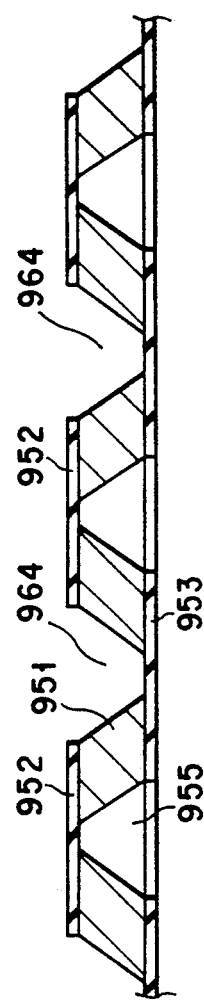
Figure 34D:
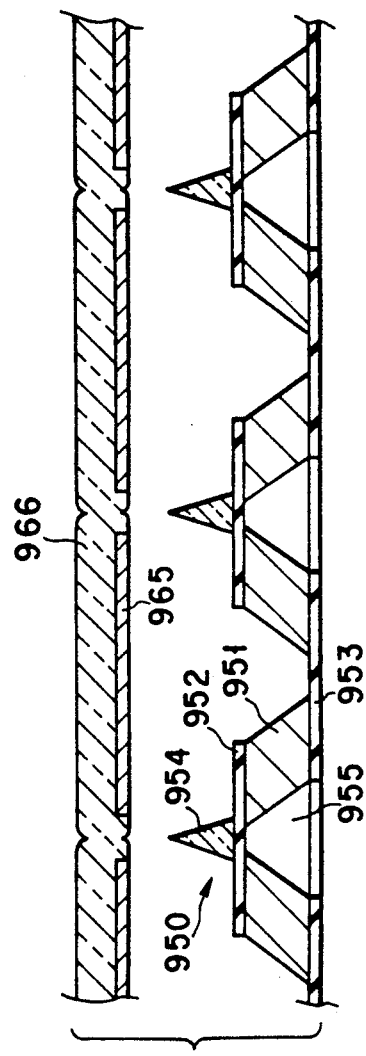

An n- or p-silicon substrate 960 provided with main faces each being a crystal face (100) is prepared and insulating films 961 and 962 made of $SiO_2$, for example, are formed on the top and underside of the silicon substrate 960 (FIG. 34A). The insulating film 961 on the top of the silicon substrate 960 is patterned in such a way that rectangle-shaped insulating films 952 are formed like a matrix on the top of the substrate 960 with an interval, larger than $\sqrt{2}t$ when the thickness of the silicon substrate 960 is (t), interposed between them and an insulating film 953 provided with rectangular openings 963 each having side longer than $\sqrt{2}t$ and each corresponding to each of the rectangular insulting films 952 is formed on the underside of the silicon substrate 960 (FIG. 34B). The anisotropic etching of the humidity type is then applied to the silicon substrate 960 while using the insulating films 952 and 953 as masks and also using etching liquid such as KOH or ethylene-diamine/-pyrocatechol/water. A hole 955 is thus formed like a reversed pyramid in the silicon substrate 960, developing from its corresponding opening 963 of the insulating film 953 on the underside of the silicon substrate 960, while V-shaped grooves 964 are developed from the top of the silicon substrate 960, crossing one another along lines of the rectangular insulating films 952 on the top of the silicon substrate 960 (FIG. 34C). Finally, a mask 965 having circular openings is arranged to position its openings above centers of their corresponding insulating films 952 and glass 966 is deposited on the insulating films 952 through the mask 965 by the electronic beam vapor deposition or sputtering to thereby form a conical glass or probe 954 on each of the insulating films 952. The forming of the probe units 950 is thus finished (FIG. 34D).

A fifteenth embodiment of the present invention will be described with reference to FIGS. 35 and 36. This embodiment relates to a system for attaching the probe unit according to the eleventh embodiment of the present invention to the mirror body of the near-field microscope.

The probe of the near-field microscope is positioned extremely near the sample. It is therefore often contacted with the sample and this causes it to be stained and broken. It is therefore preferable that the probe can be exchanged with a new one.

Figure 35:
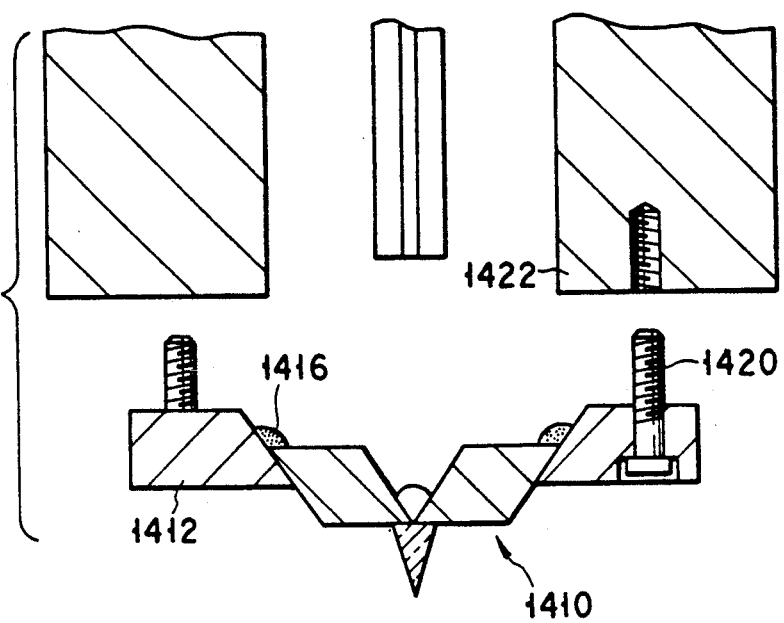
FIG. 35 shows a system for attaching the probe unit to the microscope according to a fifteenth embodiment of the present invention.
Figure 36:
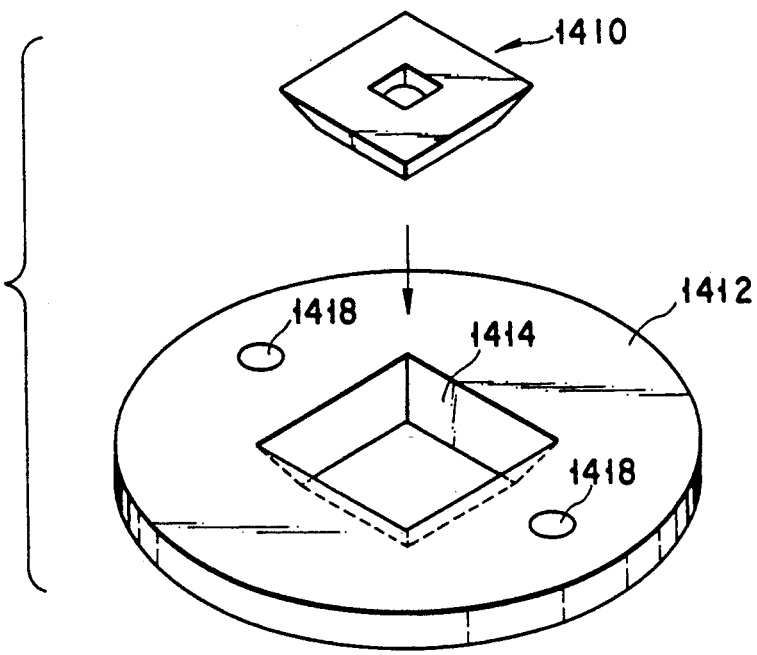
FIG. 36 is a perspective view showing the probe unit and a holder in FIG. 35.

The fifteenth embodiment is intended to meet this need and it includes a holder 1412 for housing and fixing a probe unit 1410 therein, as shown in FIGS. 35 and 36. The holder 1412 has an opening 1414, which is formed by exposing crystal faces (111) of a silicon substrate in such a way that the anisotropic etching of the humidity type same as the one used to form a probe unit 1410 is applied to the silicon substrate. Side walls of the probe unit 1410 and the opening 1414 are crystal faces (111) and when the probe unit 1410 is fitted into the opening 1414, therefore, they are face-contacted with each other. The probe unit 1410 can be thus stably held in the opening 1414. The opening 1414 in the holder 1412 has one side set a little longer than that of the probe unit 1410 and this enables the lower portion of the probe unit 1410 to be projected downwards from the underside of the holder 1412 when the probe unit 1410 is held in the opening 1414. The probe unit 1410 housed in the opening 1414 is fixed to the holder 1412 by adhesive 1416. In other words, a combination of the probe unit 1410 and the holder 1412 is made exchangeable. The holder 1412 is provided with screw holes 1418 and this exchangeable combination of the probe unit and the holder can be attached to a mirror body 1422 of the microscope by means of screws 1420.

Figure 37:
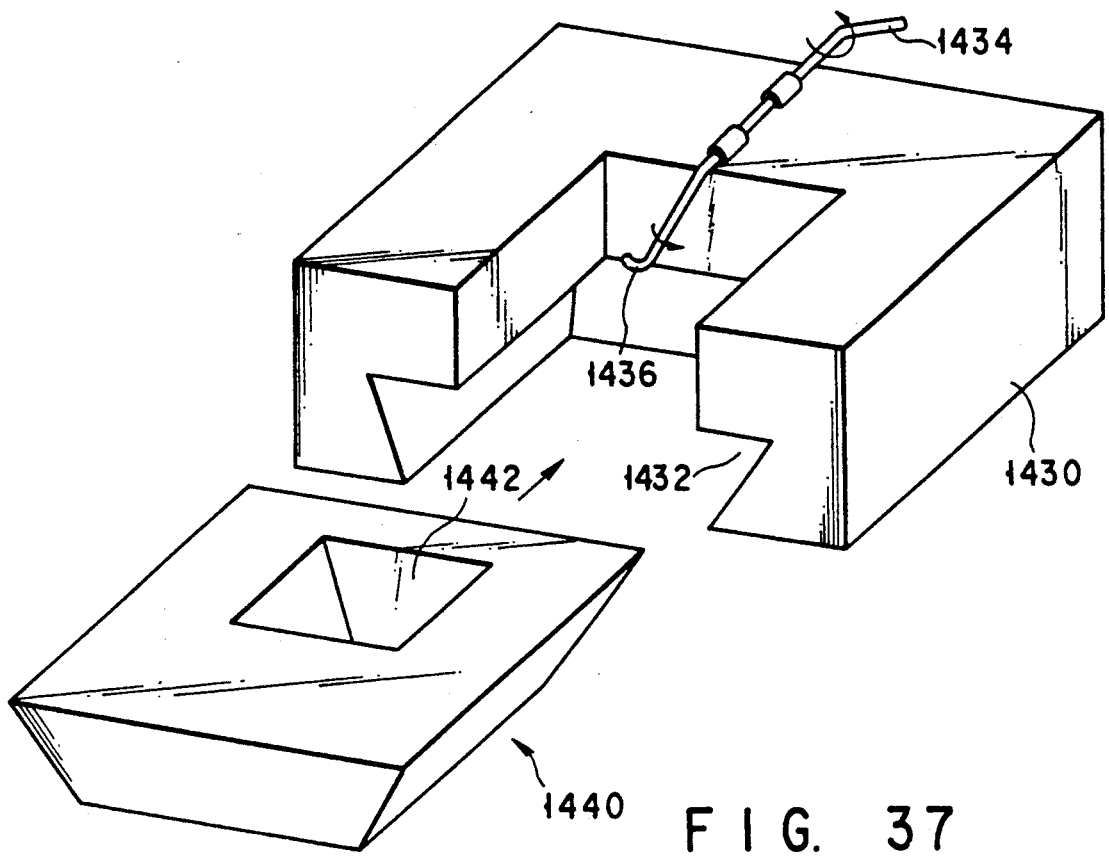
FIG. 37 shows another system for attaching the probe unit to the microscope according to a sixteenth embodiment of the present invention.
Figure 38A:
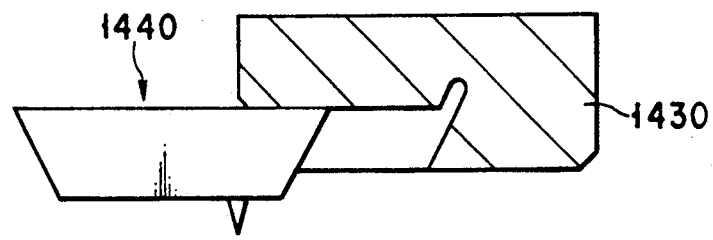
FIGS. 38A and 38B show how the probe unit in FIG. 37 is fitted into a holder.
Figure 38B:
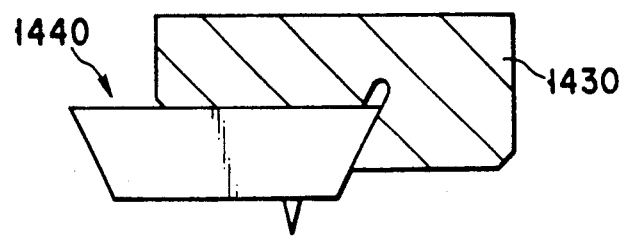
Figure 39:
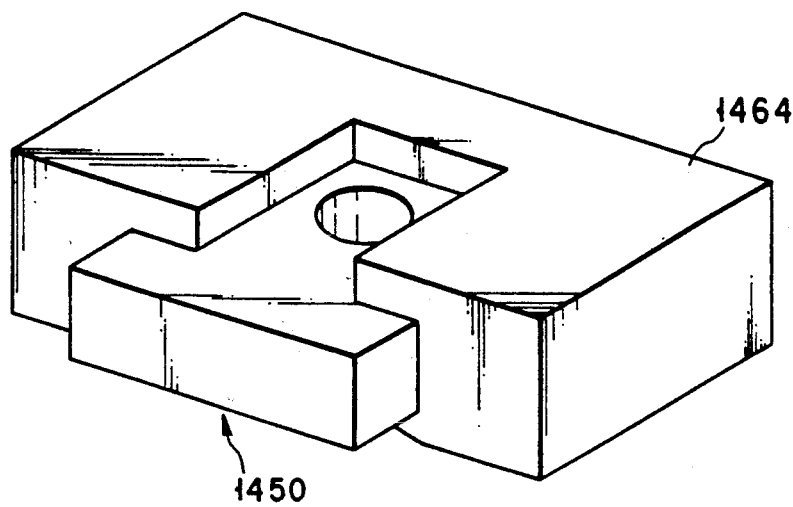
FIG. 39 shows a further system for attaching the probe unit to the microscope according to a seventeenth embodiment of the present invention.
Figure 40:
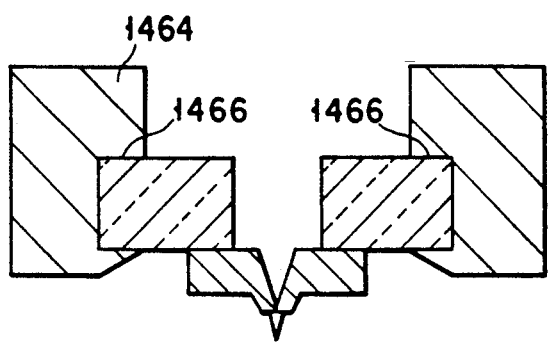
FIG. 40 is a sectional view showing the probe unit and the holder in FIG. 39.

The probe unit attaching system according to a sixteenth embodiment of the present invention will be described referring to FIG. 37. This embodiment has a U-shaped holder 1430 and the holder 1430 includes guide groves 1432 which are formed on both inner side walls of the holder 1430 and along which a probe unit 1440 is fitted into the holder 1430. FIGS. 38A shows the probe unit 1440 being inserted into the holder 1430 and FIG. 38B shows the probe unit 1440 completely inserted into the holder 1430. A small clearance is provided between the probe unit 1440 and each of the guide grooves 1432 so as to allow the probe unit 1440 to be smoothly exchanged. The unsteadiness of the probe unit 1440 in the holder 1430 caused by the presence of clearances can be overcome in such a way that a press lever 1434 attached to the holder 1430 is rotated in a direction shown by arrows in FIG. 37, after the probe unit 1440 is completely inserted into the holder 1430, so as to press the bottom of a hole 1442 in the probe unit 1440 by its front end portion 1436. In the case of the probe unit shown in FIGS. 38A and 38B, its probe is shifted from its center to right (or toward the holder) to allow it to be held by a pincette, for example, when it is inserted into and pulled out of the holder.

Figure 41:
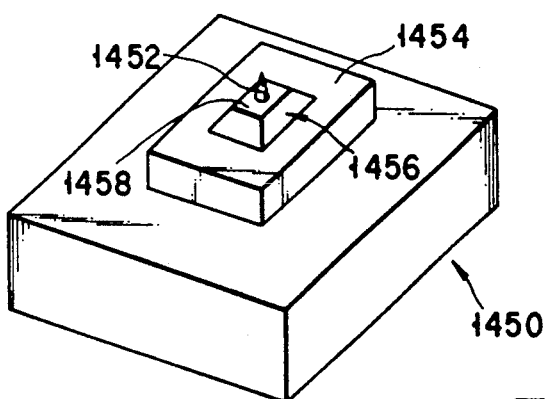
FIG. 41 is a perspective view showing the probe unit used by the system in FIG. 39.
Figure 42:
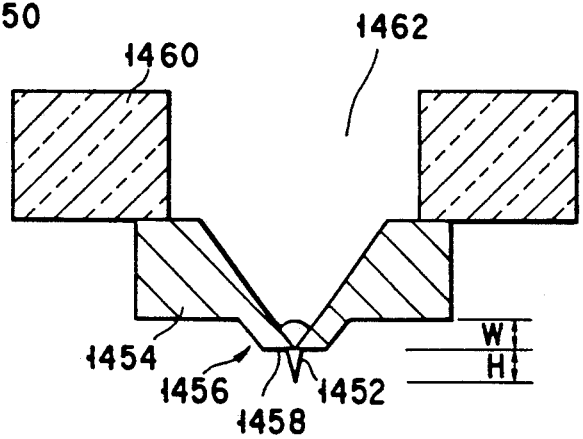
FIG. 42 is a sectional view taken along a line passing through the probe of the probe unit in FIG. 41.

The probe unit attaching system according to a seventeenth embodiment of the present invention will be described with reference to FIGS. 39 through 42. A probe unit 1450 in this case has a stepped portion 1456 on the top of a silicon-made base member 1454 and probe 1452 is formed on the top of this stepped portion 1456, as shown in FIGS. 41 and 42. When that area of the base member 1454 on which the probe 1452 is formed is large, the sample tilted may be contacted with one of edges of the area of the base member 1454. The stepped portion 1456, therefore, provides a top face or area 1458 to make the probe-formed area of the base member 1454 as small as possible. When the stepped portion 1456 is formed on the top of the base member 1454, however, that portion of the base member 1454 which is left around the stepped portion 1456 becomes thin to thereby reduce the mechanical strength of the probe unit 1450. A glass base 1460 is therefore bonded to that face of the base member 1454 which is opposite to the probe 1452 to reinforce the mechanical strength of the probe unit 1450. The glass base 1460 may be bonded to the base member 1454 by adhesive or anode bonding. The glass base 1460 is provided with a hole 1462 through which light can be picked up from the probe. The hole 1462 may be formed in the glass member 1460 by the mechanical cutting or chemical etching.

The probe unit 1450 is housed and supported in a holder 1464 by inserting the glass member 1460 into the holder 1464 along guide grooves 1466 which are formed on both inner sides of the holder 1464.

Figure 43:
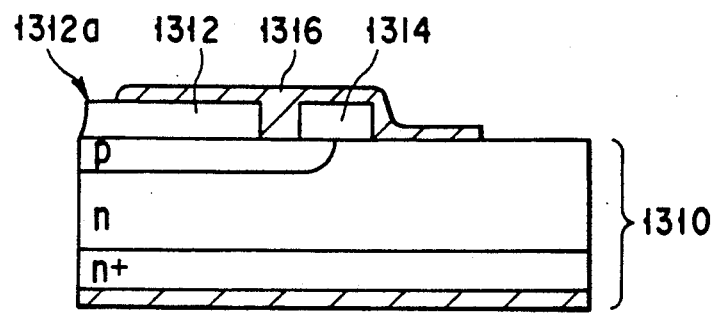
FIG. 43 shows the probe unit according to an eighteenth embodiment of the present invention.

An eighteenth embodiment of the present invention will be described referring to FIGS. 43 and 44. In the case of this embodiment, glass films 1312 and 1314 each having a thickness of several $\mu m$ are formed on the top of a photo-diode 1310 by the sputtering and an anode electrode 1316 is formed on them, as shown in FIG. 43. An edge 1312a of the glass film 1312 is made sharp by cutting the glass film 1312 by the focused ion beam.

Figure 44:
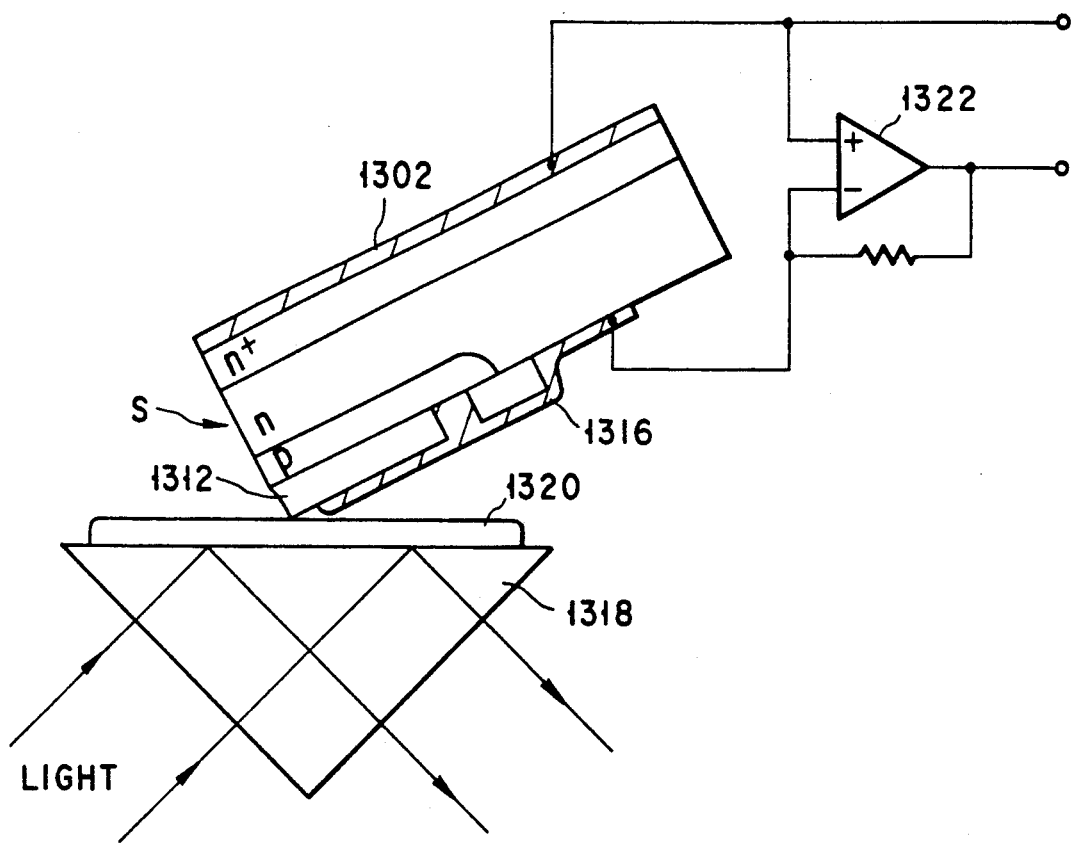
FIG. 44 shows how the probe unit in FIG. 43 is used.
Figure 45:
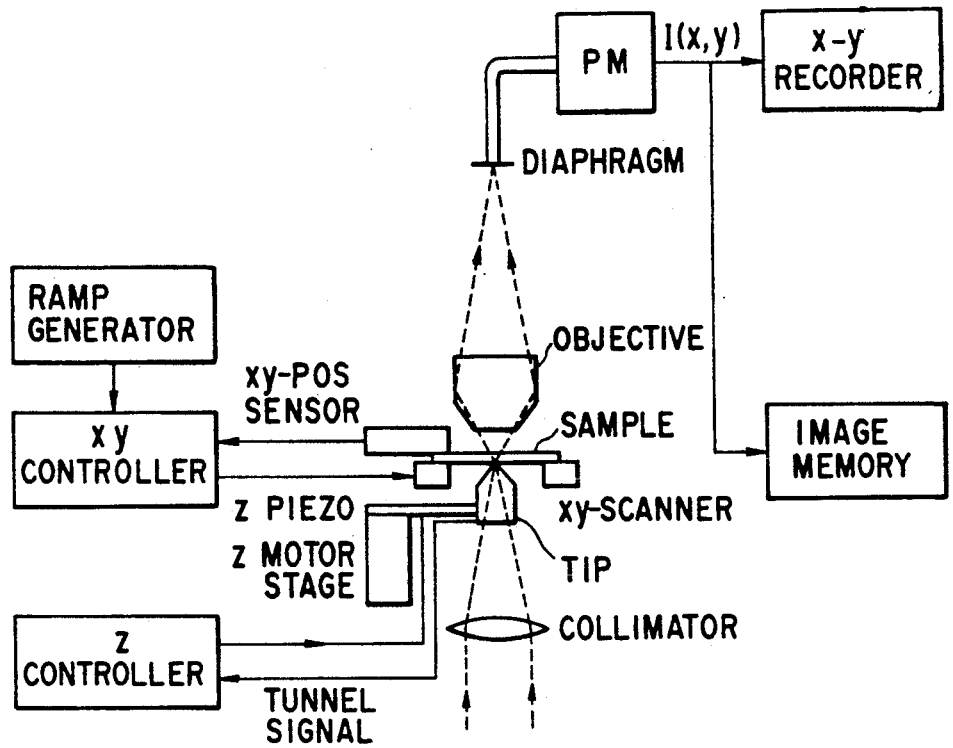
FIG. 45 shows an arrangement of the near-field microscope.
Figure 46:
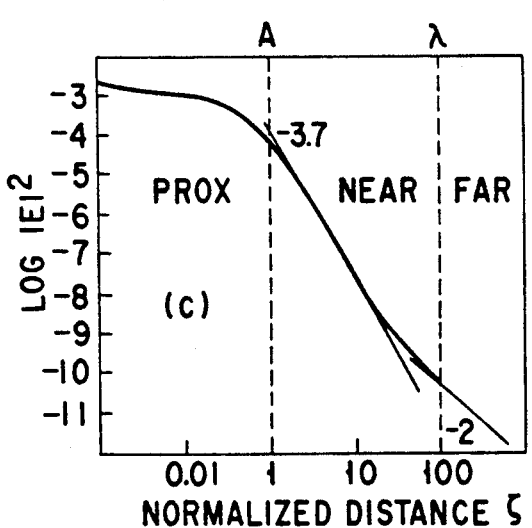
FIG. 46 is a graph showing what relation the logarithmic strength of evanescent light has relative to distances measured from the aperture of the probe unit.
Figure 47A:
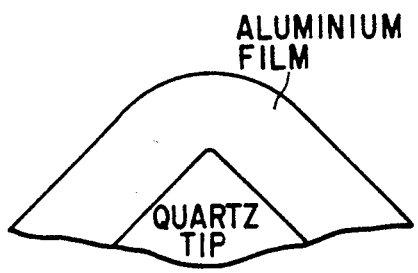
FIGS. 47A and 47B show how the probe used by the near-field microscope in FIG. 45 is made.
Figure 47B:
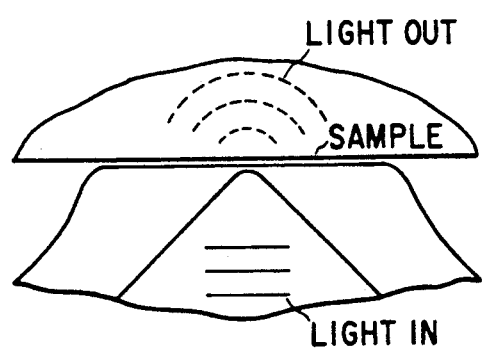

A chip (or probe unit) thus made is tilted relative to a sample 1320, as shown in FIG. 44. The sample 1320 is mounted on a prism 1318 and light is shot from below to the prism 1318. The evanescent light coming out of the sample 1320 enters into the chip through the edge 1312a of the glass film 1312 and it is detected as output signal applied from a comparator 1322 which is connected to anode and cathode electrodes 1316 and 1302

The glass film 1312 is coated by the anode electrode 1316, which is made of chromium and aluminium, except its edge 1312a and its area adjacent to this edge. This reduces noises caused by disturbance. In order to further reduce noises caused by disturbance, it is preferably that the light shielding treatment is applied to the pn junction S. The evanescent light is quite faint. In order to enhance the S/N ratio, therefore, it is preferable to prevent noises from being added to signal picked up from the electrodes. This can be achieved in such a way that the whole of the chip is coated by insulators while leaving the edge 1312a of the glass film 1312 not coated and that shielding electrodes are further laminated on them. It is well-known that it is effective to cool Peltier elements of the photo-diode and this is also employed by this embodiment.

The chips each including the semiconductor laser and the photo-diode as its components and used with the near-field microscope are directed to consumption goods. When they become complicated in structure, their cost become high. It is therefore preferable to make them simple in structure. The above-described chips according to the present invention are quite simpler in structure and this makes their cost relatively lower.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A probe unit for a near-field optical scanning microscope comprising:
   an optically-transparent probe; and
   a base member having a through-hole and supporting the probe;
   wherein said probe is coupled to said base member to be optically aligned with said through-hole therein.

2. The probe unit according to claim 1, further comprising:
   light emitting means for emitting light; and
   light introducing means for introducing light emitted from the light emitting means into the probe;
   wherein evanescent light is radiated from a tip portion of the probe.

3. The probe unit according to claim 1, wherein one end of said through-hole in said base member is covered by a thin film on which said probe is mounted, said thin film comprising at least one of an electrically insulating film and an anti-reflection film.

4. The probe unit according to claim 2, wherein one end of said through-hole in said base member is covered by a thin film on which said probe is mounted, said thin film comprising both an electrically insulating film and an antireflection film, formed on the electrically insulating film, for preventing reflection of light from the light introducing means at the electrically insulating film.

5. The probe unit according to claim 2, wherein matching oil is interposed between the light introducing means and the probe to prevent reflection of light due to a changing refractive index of an optical path extending from the light introducing means to the probe.

6. The probe unit according to claim 5, further comprising means for adding the matching oil between the light introducing means and the probe.

7. The probe unit according to claim 2, wherein said light introducing means comprises an optical fiber which is fixed in said through-hole in said base member at a first end thereof and which serves to lead light into the probe, when light emitted from said light emitting means is incident on a second end of said optical fiber.

8. The probe unit according to claim 2, wherein said light introducing means comprises a fiber bundle including a plurality of optical fibers, said fiber bundle being fixed in said through-hole in said base member at a first end thereof and serving to lead light into the probe, when light emitted from said light emitting means is incident on a second end of said fiber bundle.

9. The probe unit according to claim 8, wherein said light emitting means includes plural light sources for emitting lights which are different in wavelength, and wherein each of said plurality of optical fibers of said fiber bundle corresponds to a respective one of the plural light sources and leads light from the corresponding respective light source into the probe.

10. The probe unit according to claim 1, further comprising:
    light detector means for detecting light; and
    light leading means for leading light from the probe to the light detector means;
    wherein a tip portion of said probe picks up evanescent light emitted from a sample, and wherein said light leading means leads the picked up evanescent light to the light detector means.

11. The probe unit according to claim 10, wherein matching oil is interposed between the optical means and the probe to prevent reflection of light due to a changing refractive index of an optical path extending from the probe to the optical means.

12. The probe unit according to claim 11, further comprising means for adding the matching oil between the optical means and the probe.

13. The probe unit according to claim 10, further comprising an interference filter arranged between said through-hole in said base member and the light detector means to selectively allow only evanescent light to pass therethrough.

14. The probe unit according to claim 10, wherein said light leading means comprises an optical fiber.

15. The probe unit according to claim 14, further comprising lens means arranged between the optical fiber and the probe.

16. The probe unit according to claim 15, wherein said lens means comprises a micro-lens fixed to a larger one of two openings of said through-hole in said base member.

17. The probe unit according to claim 15, wherein said lens means comprises a ball lens fixed in said through-hole in said base member.

18. The probe unit according to claim 15, wherein said lens means comprises a lens made of a resin provided in said through-hole in said base member.

19. The probe unit according to claim 2, further comprising a metal film covering portions of the probe except for the tip portion thereof, and wherein the evanescent light is passed through a fine aperture of the tip portion.

* * * * *